US005675129A

United States Patent [19]

Burns et al.

[11] Patent Number: 5,675,129

[45] Date of Patent: Oct. 7, 1997

[54] INITIAL TRACK RECOVERY IN POSITION-SENSING SYSTEMS THAT USE WINDOWING PATTERNS

[75] Inventors: John Burns; Sheelagh Anne Lloyd, both of Cliftonwood, United Kingdom

[73] Assignee: Hewlett-Packard Company, Palo Alto, Calif.

[21] Appl. No.: 403,841

[22] PCT Filed: Sep. 30, 1994

[86] PCT No.: PCT/GB92/01798

§ 371 Date: Mar. 17, 1995

§ 102(e) Date: Mar. 17, 1995

[87] PCT Pub. No.: WO94/08316

PCT Pub. Date: Apr. 14, 1994

[51] Int. Cl.[6] .................................................... G08C 21/00

[52] U.S. Cl. .......................... 178/18; 345/157; 250/55 C; 235/454

[58] Field of Search ................................ 178/18, 19, 20; 345/157, 166, 162, 175; 250/556, 557; 235/454, 456; 341/5, 13; 392/313, 314, 321, 322, 323

[56] References Cited

U.S. PATENT DOCUMENTS

| | | | |
|---|---|---|---|
| 4,521,773 | 6/1985 | Lyon | 345/166 |
| 4,691,199 | 9/1987 | Shell | 345/166 |
| 4,751,380 | 6/1988 | Victor et al. | 345/166 |
| 4,880,967 | 11/1989 | Kwang-Chein | 345/166 |
| 5,051,736 | 9/1991 | Bennett et al. | 178/19 |
| 5,086,197 | 2/1992 | Liou | 178/18 |
| 5,442,147 | 8/1995 | Burns et al. | 178/18 |
| 5,477,012 | 12/1995 | Sekendur | 178/18 |

FOREIGN PATENT DOCUMENTS

| | | |
|---|---|---|
| 0206246 | 12/1980 | European Pat. Off. . |
| 0171284 | 2/1986 | European Pat. Off. . |
| 0206246 | 12/1986 | European Pat. Off. . |
| 0270109 | 7/1988 | European Pat. Off. . |
| 0276109 | 7/1988 | European Pat. Off. . |

OTHER PUBLICATIONS

"New Pseudorandom/Natural Code Conversion Method" by E.M. Petriu appearing in Electronic Letters 27th Oct. 1988 vol. 24 No. 22.

"Pseudo-Random Sequences and Arrays" by Jessie MacWilliams and Neil J.A. Sloane sppearing in the Proceedings of the IEEE, vol. 64, No. 12 Dec. 1976.

"Developments in the Measuring of the Absolute Position of Automated Guided Vehicle", by E.M. Petriu and Frans C.A. Groen.

Proceedings of the IEEE, "PseudoRandom Sequences and Arrays", Dec. 1976, MacWilliams et al, pp. 1715–1730.

*Primary Examiner*—Curtis Kuntz
*Assistant Examiner*—Paul Loomis

[57] ABSTRACT

To determine the track of an element in terms of the components of its displacement parallel to a predetermined axis, the element is arranged to be movable relative to a pattern having pattern features which considered in directions parallel to said predetermined axis form a series exhibiting a windowing property. By sensing the pattern features traversed by the element and comparing window-length portions of this succession of features with a stored representation of the overall series of features, it is possible eventually to detect an initial location of the element along this series. Further movement of the element can then be tracked incrementally; however, there will generally be a substantial initial track portion preceding the first location fix. By keeping a record of the pattern features sensed during this initial track, it is possible to carry out a backtracking process to seek to recover this initial track, this process involving working backwards away from the first location fix and using, for example, an incremental tracking technique with provision for reversal recovery.

14 Claims, 11 Drawing Sheets

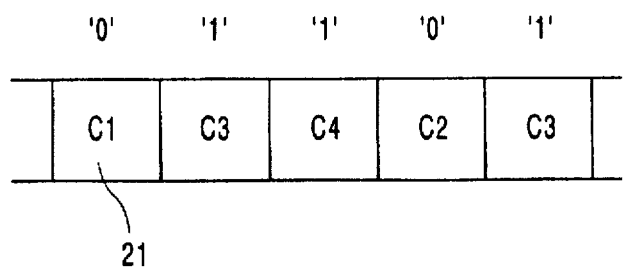
FIG 2A
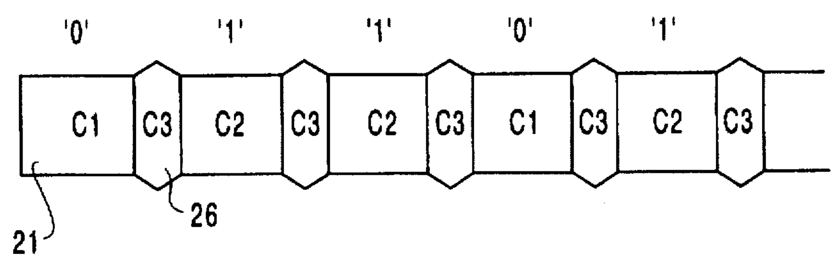
FIG 2B
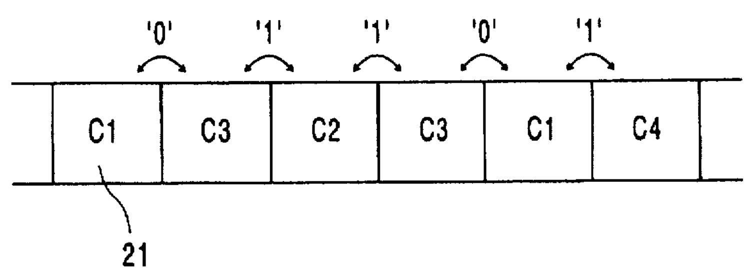
FIG 2C
FIG 2D
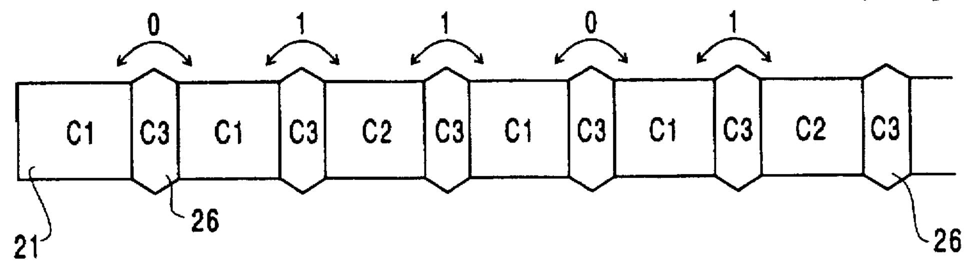

START
RESET
LIST 68
REG 69
FIFO 76
LIFO 70
INITIALISE TMODE←A
RESULT←L
Cn1, Cn2, Cn3←0
105
X BIT PROCESS
60
GET NEW
X BIT VALUE
STORE IN NEW - X
106
TRACKING
107
TMODE
A
R
I
ABSOLUTE
INCREMENTAL
REVERSAL RECOVERY
102
131
MATCH
NO
YES
100
101
103
RR STARTUP
108
RESULT
L
D
S
TMODE
A/R
111
I
TMODE ←R
110
112
TMODE =A
&
LIFO 70 NOT
EMPTY
YES
NO
113
BACK-TRACKING
TMODE ←I
109

START
ENTER NEW X BIT IN SHIFT REGISTER 69 STORE ANY OVERFLOW IN LIFO 70
120
'ABSOLUTE'
100
121
NO
Cn 1 = N?
YES
LOOK UP WINDOW LENGTH SEQUENCE HELD IN REGISTER 69 IN INDEX 67
125
122
INCREMENT Cn 1
NO
FOUND ?
126
YES
123
MAKE 'DEFER' ENTRY IN O/P FIFO 76
ENTER POINTER IN LIST 68 ENTER CURRENT & PRECEDING POSITIONS IN O/P FIFO 76
127
RESULT ⟵ D
RESULT ⟵ S
128
124
RETURN

'INCREMENTAL'
101
START
COMPARE NEW BIT WITH NEXT BIT ON FROM POINTER
130
131
MATCH ?
NO
TO RR STARTUP
103
YES
INCREMENT POINTER
132
STORE NEW POSITION IN O/P FIFO 76
133
RESULT ← S
134
RETURN FROM RR STARTUP
103
RETURN

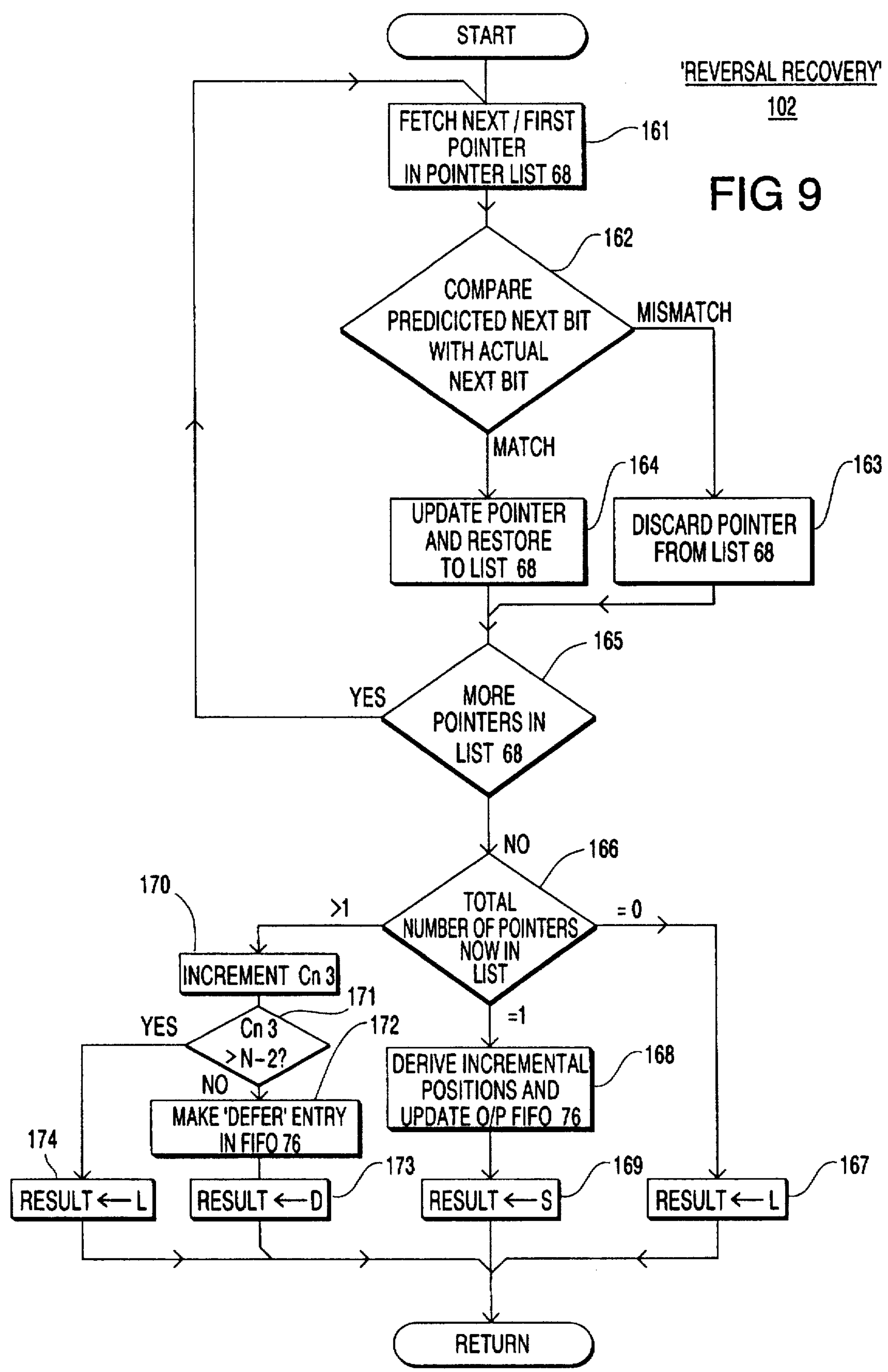
START
'REVERSAL RECOVERY'
102
FETCH NEXT / FIRST POINTER IN POINTER LIST 68
161
FIG 9
162
COMPARE PREDICICTED NEXT BIT WITH ACTUAL NEXT BIT
MISMATCH
MATCH
164
163
UPDATE POINTER AND RESTORE TO LIST 68
DISCARD POINTER FROM LIST 68
165
YES
MORE POINTERS IN LIST 68
NO
166
170
>1
TOTAL NUMBER OF POINTERS NOW IN LIST
= 0
INCREMENT Cn 3
171
YES
Cn 3 >N-2?
172
=1
DERIVE INCREMENTAL POSITIONS AND UPDATE O/P FIFO 76
168
NO
MAKE 'DEFER' ENTRY IN FIFO 76
174
173
169
167
RESULT ← L
RESULT ← D
RESULT ← S
RESULT ← L
RETURN

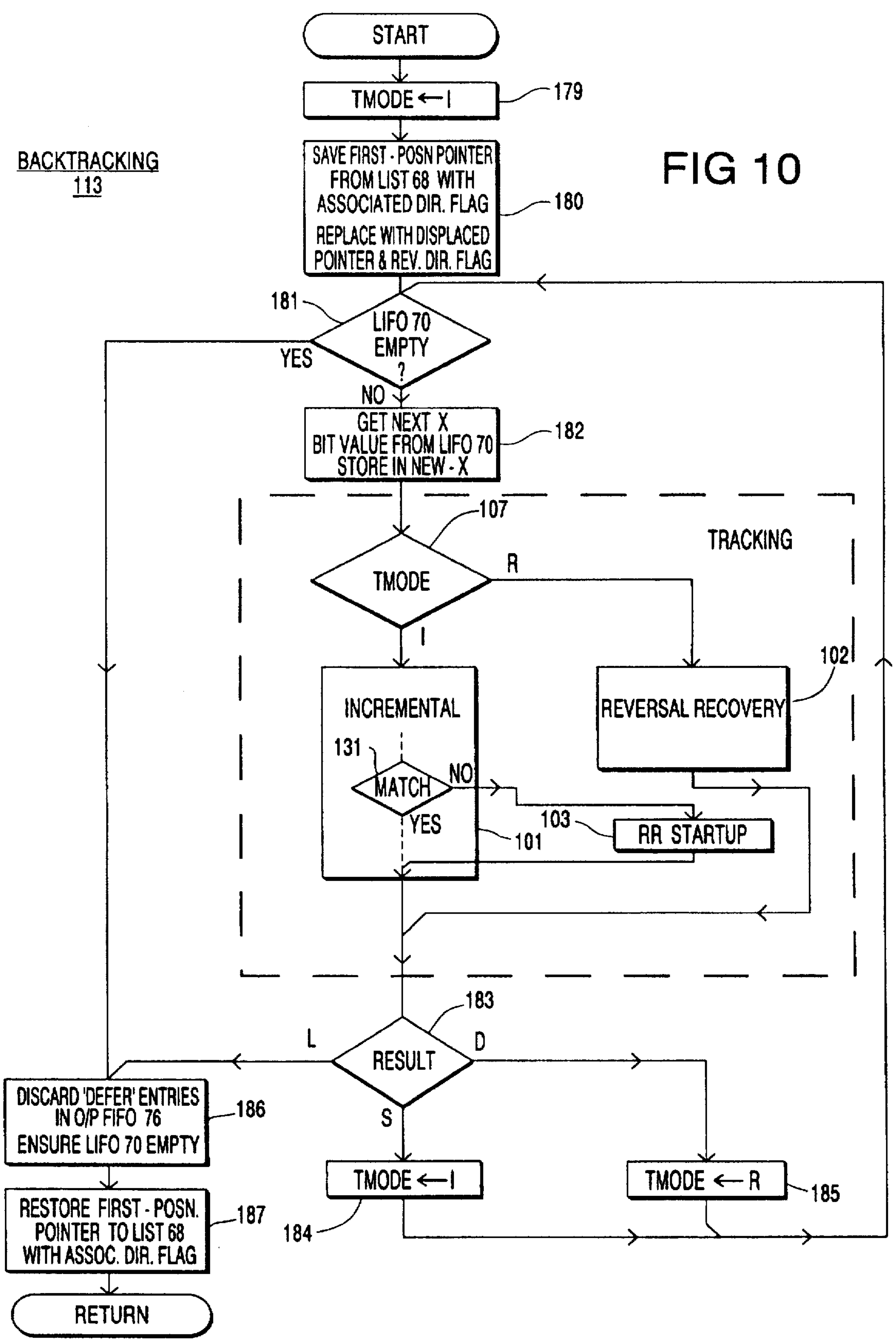

START
TMODE ← I
179
BACKTRACKING
113
SAVE FIRST - POSN POINTER FROM LIST 68 WITH ASSOCIATED DIR. FLAG
REPLACE WITH DISPLACED POINTER & REV. DIR. FLAG
180
FIG 10
181
LIFO 70 EMPTY ?
YES
NO
GET NEXT X BIT VALUE FROM LIFO 70 STORE IN NEW - X
182
107
TRACKING
TMODE
R
I
INCREMENTAL
131
MATCH
NO
YES
101
102
REVERSAL RECOVERY
103
RR STARTUP
183
L
D
RESULT
S
DISCARD 'DEFER' ENTRIES IN O/P FIFO 76
ENSURE LIFO 70 EMPTY
186
TMODE ← I
184
TMODE ← R
185
RESTORE FIRST - POSN. POINTER TO LIST 68 WITH ASSOC. DIR. FLAG
187
RETURN

INITIAL TRACK RECOVERY IN POSITION-SENSING SYSTEMS THAT USE WINDOWING PATTERNS

TECHNICAL FIELD

The present invention relates to a method and apparatus for determining the track of an element in terms of the components of its displacement parallel to a predetermined axis, the element being movable relative to a pattern having pattern features which considered in directions parallel to said predetermined axis form a series exhibiting a windowing property.

BACKGROUND ART

It is known to detect linear position by providing a linear pattern that encodes a pseudo-random binary sequence (PRBS, also known as an "m-sequence") and then using the window property of such a sequence to effect position detection by detecting a window-length subsequence of the pattern. An example of such a system is described in the article "New Pseudorandom/Natural Code Conversion Method" by E. M. Petriu appearing in Electronic Letters 27th October 1988 Vol. 24 No. 22.

By "window property" is meant the property that for a PRBS of length ($2^k$-1), where k is an integer, any subsequence of length k will be unique and therefore uniquely locatable in the sequence; this and other properties of PRBSs are described, for example, in the article "Pseudo-Random Sequences and Arrays" by F. Jessie MacWilliams and Neil J. A. Sloane appearing in the Proceedings of the IEEE, Vol. 64, No. 12 December 1976.

Our co-pending International Application No. PCT/GB92/00594 describes two-dimensional position sensing apparatus which in the preferred implementations use patterns that encode two orthogonal binary windowing sequences, the apparatus being effective to decode and separate out the portions of these sequences sensed by a sensing head as it is moved over the pattern. Two-dimensional position determination is thus reduced to effecting position determination along two orthogonal sequences as separate processes (although, of course, it is still necessary to coordinate the results of these processes to produce a two dimensional position track). For each sequence a tracking process is used that involves effecting an initial position fix using the windowing property of the sequence. However, because the initial track of the sensing head may include reversals, it will generally require a substantial track length before a window length sequence free of reversals is obtained from which an absolute position fix can be derived. Once an absolute position has been established along one of the sequences, subsequent position tracking for that sequence is effected by an incremental tracking technique coupled with a process for dealing with limited track reversals.

In the tracking process disclosed in the aforesaid International Application, the initial track of the sensing head across the pattern occurring prior to the first absolute position fix, is not recoverable. In practice, this has proven to be a disadvantage. It is an object of the present invention to overcome this disadvantage by providing for initial track recovery.

DISCLOSURE OF THE INVENTION

According to one aspect of the present invention, there is provided a method of determining the track of an element in terms of the components of its displacement parallel to a predetermined axis, the element being movable relative to a pattern having pattern features which considered in directions parallel to said predetermined axis form a series exhibiting a windowing property, the method involving:

sensing the succession of pattern features of said series traversed by the element in moving relative to the pattern, and storing a representation of said succession of features, determining an initial location for the element along said predetermined axis by comparing window-length portions of the stored representation of said succession of features with a stored representation of said series, the detection of a match at any particular position along the latter serving to determine the location of the element along said series, and following the determination of an initial location, carrying out a backtracking process to seek to recover the initial track of the element over at least the pattern features of said succession that precede those of the window-length portion used in determining the initial location of the element.

Preferably, the said series of pattern features is an encoding of a binary windowing sequence, the said representations of said series and of said succession of pattern features being in terms of the unencoded binary windowing sequence. Generally, orientable (reversible) or complement orientable sequences will be most suitable.

Advantageously, the backtracking process involves working backwards through the stored representation of said succession of features, starting from a position corresponding to a current known location of the element along said series, to determine earlier locations of the element by:

for each new portion of the stored representation of said succession of pattern features that is encountered in working backwards therethrough, comparing that portion with that predicted from the stored representation of said series on the basis of an incremental change having occurred in said current location in an assumed direction of movement, and acting on the result of said comparison as follows:

(i) where said comparison produces a match, updating the current location of the element by an incremental change in said assumed direction of movement, (ii) where said comparison produces a mismatch, carrying out a recovery process to recover the location of the element along said series, said recovery process involving deriving at least one candidate location for the element on the basis that the direction of movement of the element has been reversed, and comparing a representation of the succession of pattern features sensed along the track of the element with a representation of the pattern features predicted to lie along the element's track in reaching the or each said candidate location whereby to test the validity of the or each such location.

In one implementation, the validity of the or each said candidate location is tested during the recovery process by predicting, on the basis that a reversal of movement occurred at a location midway between the candidate location and the currently-determined one, the representation of said succession of pattern features that would be stored during movement between said midway and candidate locations, comparing this prediction with the corresponding part of the actual stored representation of said succession of features, and rejecting the candidate location if this comparison results in a mismatch.

In an alternative implementation, the recovery process involves testing the validity of the candidate location by:

(i) predicting the pattern portion sensible at the candidate location, comparing it with that predicted on the basis of an incremental change in said current location in said assumed direction of movement and rejecting the candidate location if this comparison results in a match, and/or (ii) on the assumption that a reversal of movement occurred at a location midway between said candidate location and the currently-determined location, predicting the representation of said succession of pattern features that would be stored during movement between said midway and candidate locations, but not including the latter location; comparing this prediction with, the part of said representation of said series that leads up to said current location, and rejecting the candidate location if this comparison results in a mismatch.

Whichever implementation is used, if a plurality of candidate locations are derived and remain unrejected following the testing of their validity, the recovery process preferably further involving comparing each said new portion encountered in working backwards through the stored representation of said succession of pattern features, with predictions based on each remaining candidate location, a said remaining candidate location being rejected where this comparison results in a mismatch.

The present invention is, of course, applicable to tracking two-dimensional movement. More particularly, the present invention contemplates a method of determining the track of an element in terms of the respective components of its displacement parallel to first and second axes that together form a two-dimensional coordinate system, the element being movable relative to a two dimensional pattern having pattern features which considered in directions parallel to said first and to said second axis from respective series each exhibiting a windowing property, the method employing a method according to any one of the preceding five paragraphs for determining the components of the element's displacement both parallel to said first axis and parallel to said second axis.

According to another aspect of the present invention, there is provided apparatus for determining the track of an element in terms of the components of its displacement parallel to a predetermined axis, the element being movable relative to a pattern having pattern features which considered in directions parallel to said predetermined axis form a series exhibiting a windowing property, the apparatus comprising:

means for sensing the succession of pattern features of said series traversed by the element in moving relative to the pattern, and for storing a representation of said succession of features, means for determining an initial location for the element along said predetermined axis by comparing window-length portions of the stored representation of said succession of features with a stored representation of said series, the detection of a match at any particular position along he latter serving to determine the location of the element along said series, and means operative following the determination of said initial location, to carry out a backtracking process to seek to recovery the initial track of the element over at least the pattern features of said succession that precede those of the windowing-length portion used in determining the initial location of the element.

BRIEF DESCRIPTION OF THE DRAWINGS

Position-sensing apparatus embodying the invention will now be described by way of non-limiting example with reference to the accompanying diagrammatic drawings in which:

FIG. 2A illustrates a first pattern that uses absolute-value encoding to encode a binary string into pattern cells, these cells being delineated by the use of different colours for adjacent cells;

FIG. 2B illustrates a second pattern which like that of FIG. 2A uses absolute-value encoding but which utilises separators to delineate value-encoding cells;

FIG. 2C illustrates a third pattern, this pattern using transitional encoding to encode a binary string into pattern cells and the cells being delineated by the use of different colours for adjacent cells;

FIG. 2D illustrates a fourth pattern which like that of FIG. 2C uses transitional encoding but which utilises separators to delineate value-encoding cells;

FIG. 9 is a flow chart of a tracking routine "REVERSAL RECOVERY" of the FIG. 3 process; and FIG. 10 is a flow chart of a tracking routine "BACKTRACKING" of the FIG. 3 process.

BEST MODE FOR CARRYING OUT THE INVENTION

General Form of Position Sensing Apparatus

Figure 1:
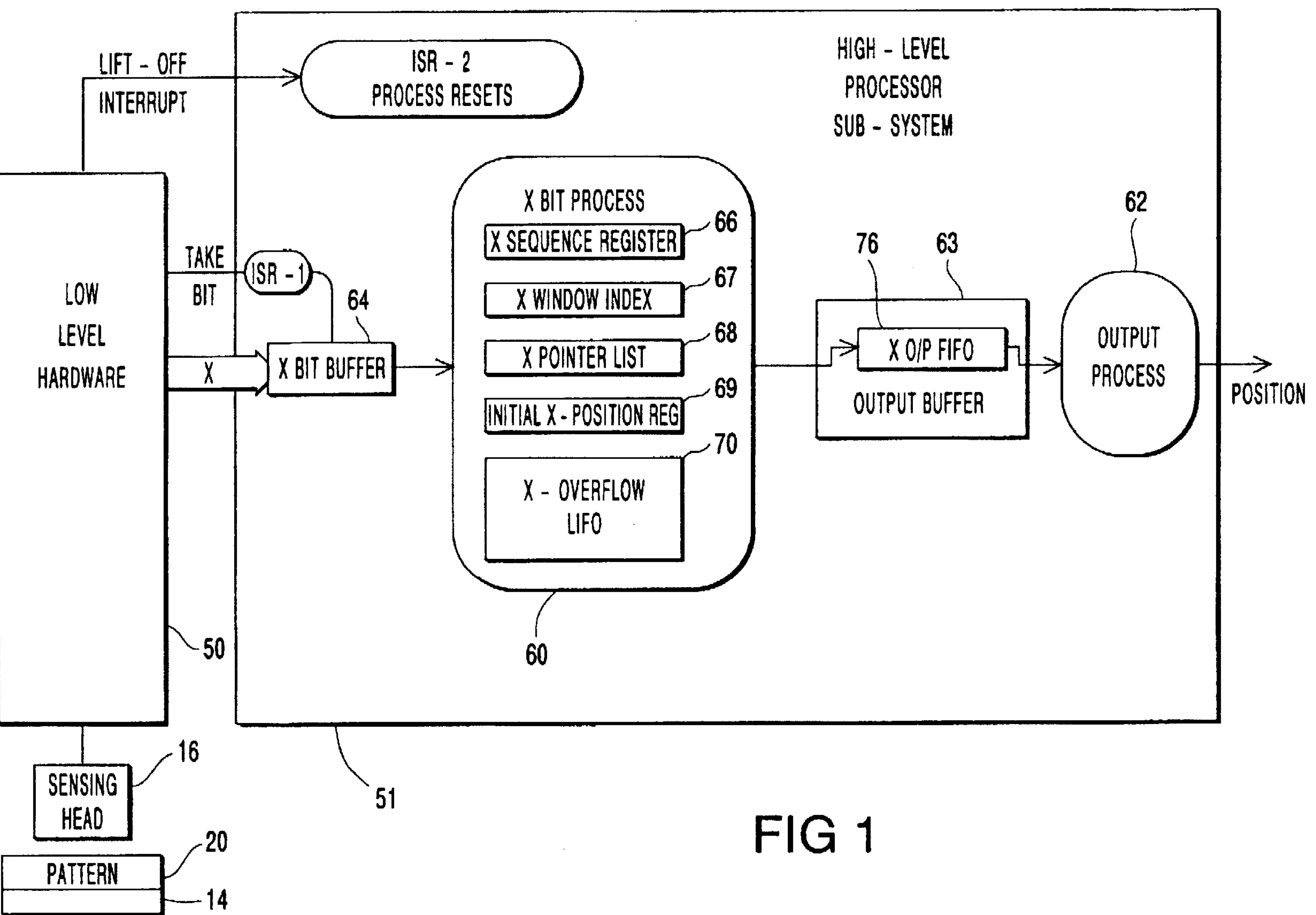
FIG. 1 is a diagram showing the main components of the position-sensing apparatus including a linear windowing pattern, a sensing head, low-level hardware, and a high-level processor sub-system.

The position-sensing apparatus shown in FIG. 1 is intended to determine the position of a sensing head 16 along a linear (but not necessarily straight) pattern 20. The position determination process involves the sensing head 16 sensing the pattern 20 in its locality and passing its output on for processing first by low-level hardware 50 and then by a high-level processor sub-system 51 to provide a position output signal. The split of processing between the hardware 50 and processor sub-system 51 is not, of course, critical and, indeed, all processing could be done either entirely in hardware or entirely in a processor-based sub-system.

The sensing head 16 is, for example, part of a hand-held stylus (not shown) or mounted on a movable machinery part (also not shown); it will, of course, be appreciated that the pattern 20 could equally well be arranged to move rather than the sensing head 16.

The pattern 20 is formed by a series of pattern features occurring along a main pattern axis and presented by indicia (not separately referenced) carried in or on a support member 14. The pattern features may have substantial extent transversely of the main pattern axis; however the pattern is still a linear one in the sense that its features only change with movement along the main pattern axis. Typically, the indicia forming the pattern are constituted by printed markings sensible by their optical/infra-red reflective characteristics. However, it is to be understood that the indicia may be sensible by any suitable characteristic including by their surface roughness, magnetic parameters, electrical parameters, optical/infra-red transmissivity etc the sensing head 16 being appropriately adapted to sense this characteristic.

The linear pattern 20 is a windowing pattern in the sense that any local portion of the pattern that is of given extent in terms of its pattern features, is, when considered in isolation, so characterised by its features as to permit the location of that pattern portion along the overall linear pattern 20 to be determined, at least for a known orientation of the pattern portion relative to the sequence as a whole. A pattern portion of such an extent as to permit its location to be determined is referred to herein as a "sub-pattern". It is this windowing property of the linear pattern 20 that is used by the FIG. 1 apparatus to determine the position of the sensing head 16 along the pattern 20.

The windowing pattern 20 will generally take the form of a regular, serial arrangement of features that encode an underlying mathematical sequence of elements that itself possess the windowing property for window length subsequences of elements.

In the present embodiment, the windowing pattern 20 encodes an underlying mathematical windowing sequence referred to as the X-sequence (simply because it is, for convenience, considered to extend in the X direction of an X-Y cartesian coordinate system). In order to determine the position of the sensing head 16 along the linear pattern 20, the FIG. 1 apparatus senses the pattern in the locality of the head 16 to thereby build up a window-length sub-sequence of the underlying X sequence, and then compares this sub-sequence with a stored representation of the overall X sequence.

The present invention is concerned with arrangements where the sensing head 16 is unable to sense sufficient of the pattern 20 when at one location to permit a full window length sub-sequence of the X sequence to be determined so that it is necessary for the sub-sequence to be built up as the sensing head 16 is displaced relative to the pattern. Although the arrangements concerned will generally involve the sensing head sensing only a single pattern feature at a time (herein referred to as 'single pixel' sensing), arrangements are also possible where the sensing head senses several pattern features at once (but less than needed for a full window-length sub-sequence to be derived) and builds up a window-length sub-sequence from sections larger than a single element.

Where less than a window-length sub-sequence is sensed by the sensing head 16 in any one location, the position of the sensing head 16 over the linear pattern 20 cannot be determined until a window length sub-sequence has been built up; as a result, the initial track of the sensing head 16 cannot be directly derived particularly if the track includes reversals of direction. The present invention is concerned with how the initial track may be subsequently recovered by a process referred to as 'backtracking'. In order to fully understand the backtracking process it is necessary to appreciate certain properties of the sequences that may be used for line X sequence and also how the X sequence may be encoded to produce the linear pattern 20. Accordingly, a review will next be given of the classes of sequences usable as the X sequence and of possible encoding techniques; a fuller review of these matters is given in the aforesaid co-pending International Patent Application PCT/GB92/00594 herein incorporated by reference.

Windowing Sequences

Although the sequences discussed below are all binary (that is, the constituent elements of the sequences can only have one of two possible values), this is merely preferred for ease of implementation and ternary and higher order sequences can also be used as the basis for windowing patterns.

Four types of usable sequences can be identified:

Type 1—deBruijn sequences;

Type 2—Pseudo-random sequences;

Type 3—Orientable sequences (that is, sequences for which each window sub-sequence of length m occurs only once, and its reverse does not);

Type 4—Complement-orientable sequences (that is, sequences for which each window sub-sequence of length m occurs only once and its complement reversed does not).

All four types are windowing. Types 1 and 2 produce 1-orientable patterns (that is, patterns for which a window-length sub-sequence can only be uniquely identified if the orientation of the sub-sequence is known relative to the overall pattern sequences). Types 3 and 4 produce 2-orientable patterns (that is, patterns for which a window-length sub-sequence can be uniquely identified regardless of its two possible orientations relative to the overall pattern sequence). The suitability of each type of sequence depends on the encoding employed and the sensing method used.

Pattern Construction—General Considerations

Generally, each binary element of the underlying mathematical sequence will be represented in the pattern sequence 20 by a corresponding pattern cell, the cell having a value, represented by a property such as colour, that is set to correspond to the element value. In fact, other information will usually also need to be recoverably contained in the pattern 20 to enable sub-pattern sensing and position determination, the information needed being dependent on the nature of the underlying sequence, the encoding method used, and on the sensing method employed. In general terms information is required as to:

sequence element value cell delineation cell inter-relationship in forming a pattern pattern orientation Information on these items can be provided in three basic ways, namely inherently in the cell values that encode the underlying sequence; as explicit auxiliary pattern features combined with the encoding represented by the cell values, and independently of the pattern. Each of the above-listed information items is discussed below.

For convenience, hereinafter the value of each cell will be taken to be represented in the pattern 20 as a colour unique to each possible value, it being appreciated that the teaching given below generally applies to any other form of physical presentation of cell value.

Sequence Value Encoding

There are two main encoding techniques, one being to allot each cell a colour representing the absolute value of a corresponding element of the array to be encoded, and the other being to encode a sequence element value as a change in colour between two cells when moving in a direction aligned with the pattern axis associated with the sequence.

Cell Delineation

It is important to be able to detect transition from one cell to another, that is, to be able to detect cell boundaries. Cell boundary information can be encoded with cell values by use of an encoding scheme which ensures that neighbouring cells do not have the same colour (even if, in the case of absolute value encoding, the same element value of the underlying sequence is being encoded). Cell boundary information can also be encoded by providing auxiliary pattern features and, in particular, by providing separator zones between the value-defining area of each cell.

The use of pattern-independent means to delimit cell boundaries is also possible, for example, by providing means that register movement of the sensing head 16 by distances corresponding to the pitch of the cells. Such arrangements are not preferred.

Cell Inter-Relationship Information

It is, of course, necessary to be able to positionally relate a sensed cell to previously sensed cells in order to ascertain the relative locations of sequence elements decoded from the sensed pattern thereby to accurately construct a window length sub-sequence. Where the sensing head 16 senses more than one cell at a time, the inter-relationship of the sensed cells can be readily derived from the sensed image, the cell inter-relationship information being directly conveyed. However, where a single-pixel sensing head is used, the cell inter-relationship must be conveyed by one (or more) of the three general ways mentioned above (inherently in the cell value, by explicit pattern features, or independently of the pattern), or else an assumption must be made regarding sensing head movement (for example, that it is moving in a straight line) and the resultant decoded sequence then checked for consistency with this assumption.

Pattern Orientation Information

Depending on the orientation characteristics of the underlying sequences, differing amounts of orientation information need to be provided. Thus, for patterns based on 2-orientable sequences, no orientation information is needed whilst for patterns constructed from 1-orientable sequences pattern orientation information can be made available in accordance with any one (or more) of the ways previously mentioned (inherently in the cell values, by explicit pattern features, or independently of the pattern). However, it may be noted that orientation information is closely related to cell inter-relation information and can generally be provided jointly with the latter.

EXAMPLE ENCODINGS

FIGS. 2A to 2D show four example encodings for the case where the X sequence to be encoded is an orientable binary sequence, that is, one for which a window length sub sequence can be uniquely located regardless of its orientation relative to the overall sequence, as a consequence of which it is unnecessary to encode orientation information into the pattern. All four examples show the encoding of the binary string ". . . 0 1 1 0 1 . . . " using coloured cells 21, the colour of a cell being one of up to four colours referenced C1, C2, C3 and C4 respectively.

In the FIG. 2A example, absolute-value encoding has been used to encode the binary string values into cell colour. Delineation between cells is achieved by ensuring a change in colour between adjacent cells, even if these cells represent the same binary value. In order to enable cell colour to be used both to represent binary values and to distinguish between adjacent cells, four different colours C1 to C4 are required with two colours representing binary '0' and two representing binary '1' as follows:

C1='0'

C2='0'

C3='1'

C4='1'

The FIG. 2A pattern does not encode any cell inter-relationship information so that it is not possible for the sensing head 16 to tell from the pattern whether a newly sensed cell lies to the right or left of the last sensed cell (as viewed in the Figure).

The FIG. 2B pattern example also uses absolute value encoding but effects cell delineation by the use of explicit pattern features, in this case, separators 26. These separators 26 are distinguished from the cells 21 by colour. With such an arrangement, it is only necessary to use one colour for each binary value. Only three colours in total are required, as follows:

C1='0'

C2='1'

C3=separator 26

Again, no cell inter-relationship information is encoded in the pattern.

The FIG. 2C pattern example uses transitional encoding to encode the binary string value as changes in pattern cell colour. In addition, cell delineation is effected by ensuring that adjacent cells are of different colours. No cell inter-relationship information is encoded in the pattern. In the present example, four colours C1 to C4 are used to achieve the encoding of binary value information and cell delineation information, the encoding being effected in accordance with the following table that gives the colour of the next cell in dependence on the last cell colour and the binary value to be encoded:

TABLE 1

| | | VALUE TO BE ENCODED | |
|---|---|---|---|
| | | '0' | '1' |
| PRECEDING | C1 | C3 | C4 |
| CELL | C2 | C4 | C3 |
| COLOUR | C3 | C1 | C2 |
| | C4 | C2 | C1 |

The FIG. 2D pattern example also uses transitional encoding to encode the binary string value but employs separators 26 to effect cell delineation. Again, no cell inter-relationship is encoded in the pattern. The required encoding can be effected using three colours C1 to C3 with colours C1 and C2 being used as cell colours and colour C3 as the separator colour. The following encoding table gives the next cell colour (C1 or C2) in dependence on the last cell colour and the binary value to be encoded:

TABLE 2

| | | VALUE TO BE ENCODED | |
|---|---|---|---|
| | | '0' | '1' |
| PRECEDING | C1 | C1 | C2 |
| CELL COLOUR | C2 | C2 | C1 |

In the following description of the FIG. 1 apparatus, it is assumed that the pattern 20 is of the form of either FIG. 2B or 2D (that is, including separators) since in relation to the backtracking process of the present invention, these cases present a more difficult challenge than where no separators are used as will become apparent hereinafter.

Sensing Head and Low Level Hardware

The sensing head 16 and low-level hardware 50 cooperate together to sense the pattern 20 as the head 16 is moved over the pattern 20, and determine successive bit values ('X bit values') of the underlying X sequence. In the preferred form of the FIG. 1 apparatus, the sensing head 16 is a single-pixel sensing head and the low level hardware is arranged to output each successively determined X bit value by generating an interrupt 'TAKE BIT' that it feeds to the high-level processor sub-system 51 (for example, a computer work station) to cause the latter to initiate an interrupt service routine ISR-1 for transferring each new X bit value into an X bit buffer 64 of the sub-system 51.

The detailed construction of the sensing head 16 and of the low level hardware 50 will not be described herein as it is not of direct relevance to the present invention. Suitable implementations will be apparent to persons skilled in the art. Furthermore, the aforesaid International Application No PCT/GB92/00594 describes a sensing system and low-level hardware for the similar, though more complex case, of a two dimension pattern; the techniques disclosed in that Application will be readily adaptable by persons skilled in the art to the present case of a linear pattern. In this respect it is worth noting that the low-level hardware suitable for dealing with patterns using absolute encoding of sequence values (such as the FIG. 2B pattern), is closely similar to that needed to deal with patterns using transitional encoding (such as the FIG. 2D pattern).

In addition to generating a 'TAKE BIT' interrupt whenever a new X bit value is available, the low-level hardware 50 is also arranged to generate a 'LIFT OFF' interrupt whenever the sensing head 16 is removed off the pattern 20. This latter interrupt causes the processor sub-system 51 to run an interrupt service routine ISR-2 that clears the X-bit buffer 64 and resets the processes run by the sub-system 51 ready to start a new position determination when the sensing head 16 is eventually brought up to the pattern 20 again.

High Level Processor Sub-System

Turning now to a consideration of the high level processor sub-system 51, this sub-system is operative to run two processes concurrently, these being a process 60 (the XBIT process) for effecting position determination along the X sequence on the basis of the X bit values supplied by the low level hardware 50, and an output process 62 for actually outputting the X position information determined by the process 60. The output process 62 interfaces with the XBIT process 60 through an output buffer 63 in the form of a first-in, first-out FIFO 76 buffer operative to store a series of absolute X positions. Each entry in the FIFO 76 comprises a new X position and an associated flag (the Defer Flag) which, if set, indicates that the entry is only provisional and not yet to be output. The purpose of the Defer Flag will be explained more fully hereinafter.

The sub-system 51 can be implemented using a suitable multi-tasking processor system as will be apparent to persons skilled in the art.

Considering the operation of the processor sub-system 51 in more detail, as already indicated, the sub-system 51 interfaces with the low-level hardware 50 through the X bit buffer 64 formed, for example, by a first-in, first-out (FIFO) buffer. The buffer 64 thus forms an input queue of X bit values and the XBIT process 60 takes bits from the head of this queue for processing.

The XBIT process 60 will next be described. The XBIT process utilizes five main data structures, these being:

- an X-sequence register 66 storing the X-sequence bit pattern;
- an X-sequence window index 67 which for each possible window length sequence (N bits in length) present in the X-sequence (taking both directions of reading), provides a pointer into the X-sequence indicating the position of the last bit of the window length sequence (in terms of an offset from the start of the X-sequence) together with a direction flag indicating the direction of reading of the X-sequence.
- an X-pointer list 68 for holding one or more X-position pointers (and their associated direction flags) for indicating the current actual X position (during normal operation), or current candidate X positions (during a reversal recovery process to be described below);
- an initial X-position shift register 69 of length N used to assemble a window-length sequence of N bits from the sensed X-sequence bits during an initial absolute position determination phase of operation of the apparatus; and
- an X-overflow last-in, first out (FIFO) store 70 holding any XBIT values shifted completely through the shift register 69 during the initial absolute position determination phase.

Figure 3:
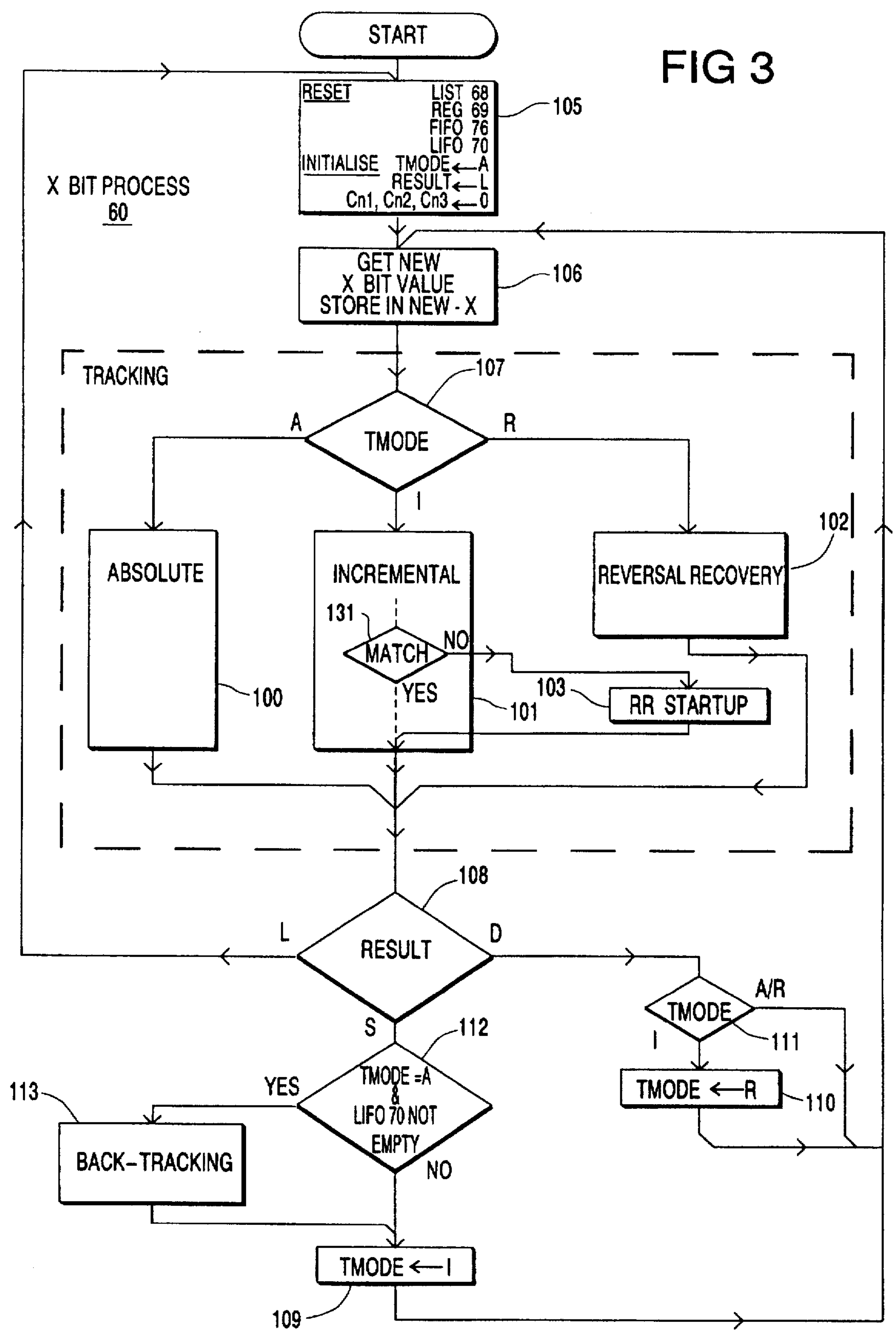
FIG. 3 is a flow chart of an XBIT process run by the high-level processor sub-system of FIG. 1.

FIG. 3 illustrates the XBIT process 60 in the form of a flow chart. The XBIT process controls position tracking along the X sequence with the actual tracking being effected by appropriate sub-routines. There are three basic tracking modes, these being:

- an "absolute" tracking mode in which absolute position determination is effected by building up a window length sequence of X bits in register 69 and then using the window index 67 to identify an absolute position, this tracking mode being used initially to ascertain an initial absolute position;
- an "incremental" tracking mode in which each new X bit received is assumed to increment the current X position in the direction indicated by the direction flag associated with the current position pointer, this mode being used once an initial absolute position has been established and until the actual next X-bit sensed does not match the next X-sequence bit in the direction indicated by the direction flag (generally such a mismatch will have occurred due to a direction of movement reversal); and a "reversal recovery" tracking mode in which an attempt is made to recover from a mismatch occurring in the incremental tracking mode by assuming that a movement direction reversal has occurred and then seeking to identify at what position the reversal took place.

The 'incremental' and 'reversal recovery' tracking modes are used both to effect "forward" tracking (that is, tracking along the track of the sensing head 16 towards the current position of the latter) and "back" tracking (that is, tracking along the track of the sensing head away from the current position of the latter). "Back" tracking is employed to recover the track of the sensing head preceding the first fix on that track achieved using the 'absolute' tracking mode, as will be more fully described hereinafter.

Tracking in the "absolute", "incremental" and "reversal recovery" tracking modes is effected by routines 100, 101, 102 respectively with a further routine 103 ("RR Start-up") being associated with the reversal recovery routine 102 as an initialization routine. A global variable TMODE serves to identify the currently operative tracking mode, this variable being assigned one of the values 'A', 'I', 'R' to indicate the "absolute", "incremental" or "reversal recovery" tracking mode respectively. A further global variable RESULT is used to indicate whether the tracking routines have been successful in their tasks, this variable having possible values 'S' to indicate success, 'D' to indicate that judgement needs to be deferred and 'L' to indicate that the routine has irrecoverably lost track of the current position. Three counts Cn1, Cn2 and Cn3 are also used in the operation of the XBIT process and its sub-routines as will become clear below.

Considering next the FIG. 3 flow chart in more detail, after start-up of the XBIT process, an initialization step 105 is instigated. During step 105 the X pointer list 68 is reset to empty, the initial X-position register 64 is reset to zero, the LIFO 70 is emptied and the output FIFO 76 is flushed. In addition, the value of "A" is assigned to the variable TMODE to start the tracking process in the absolute tracking mode, the value "L" is assigned to the variable RESULT to indicate that tracking is to be started from a completely lost condition, and the value '0' is assigned to the counts Cn1, Cn2 and Cn3. Thereafter, the XBIT process 60 executes step 106 in which it removes the top bit value from the buffer 64 and stores it in variable NEW-X.

The XBIT process 60 now proceeds to select and execute the appropriate tracking routine, this selection being effected in decision step 107 in dependence on the current value of the variable TMODE. Immediately following start-up of the XBIT process 60, the absolute tracking routine 100 is selected and executed since, of course, the value "A" has been assigned to TMODE during step 105. However, as will be seen below, as tracking continues the values stored in TMODE may change to "I" or "R" in which case the decision step 107 will select the incremental tracking routine 101 or the reversal recovery routine 102 respectively. Selection of the incremental tracking routine 101 or reversal recovery routine from the decision step 107 results in these routines being implemented to effect 'forward' tracking, this being the normal usage; 'back' tracking use of the routines 101 and 102 only occurs under special circumstances as part of the back-tracking routine 13 to be described below.

Whichever tracking routine 100, 101 and 102 is executed from decision step 107, upon completion of the selected routine the XBIT process 60 proceeds to decision step 108 where it tests the value of the variable RESULT used to indicate the success or otherwise of the executed tracking routine. If the value "L" is returned in RESULT, then this is taken as indicating that position tracking has irrecoverably failed and must be started again from scratch by returning to the initialization step 105. If the value "S" is returned in RESULT, then this indicates that the current X position is known with certainty and forward tracking can be implemented using the incremental tracking mode (this being brought about in step 109 by the value "I" being assigned to the variable TMODE). However, if the X position has just been derived using the absolute position routine 100, then decision step 112 first tests to see whether there are any overflow X bits in LIFO indicating the presence of an unrecovered initial track length; if overflow bits are present in LIFO 70, the back-tracking routine 113 is carried out to recover the actual track before forward tracking is resumed.

Returning to step, 108 if the value "D" is returned in RESULT, then this indicates that the current X position is not known for certain, but is in the process of being ascertained; this situation can occur either when the XBIT process is in its absolute tracking mode and insufficient bits have yet been accumulated to enable the absolute tracking routine 60 to effect an absolute determination of the current X position, or when the process 60 is in its reversal recovery tracking mode and the current X position has not been unambiguously determined. Generally, when RESULT is returned with "D", the tracking mode will not be changed so that the variable TMODE is unaltered. However, when reversal recovery is first initiated, this is effected by the incremental tracking routine 101 directly initiating the RR start-up routine 103 without the variable TMODE being set to "R"; in this circumstance the variable TMODE is set to the value "R" in step 110 when it is determined that RESULT has a value D and the previous value of TMODE was "I" (step 111).

When either the value "S" or "D" is returned in RESULT, then the XBIT process returns in due course to step 106 to fetch a new X bit value.

The absolute, incremental and reversal recovery tracking routines 100, 101 and 102 will now be described.

Figure 4:
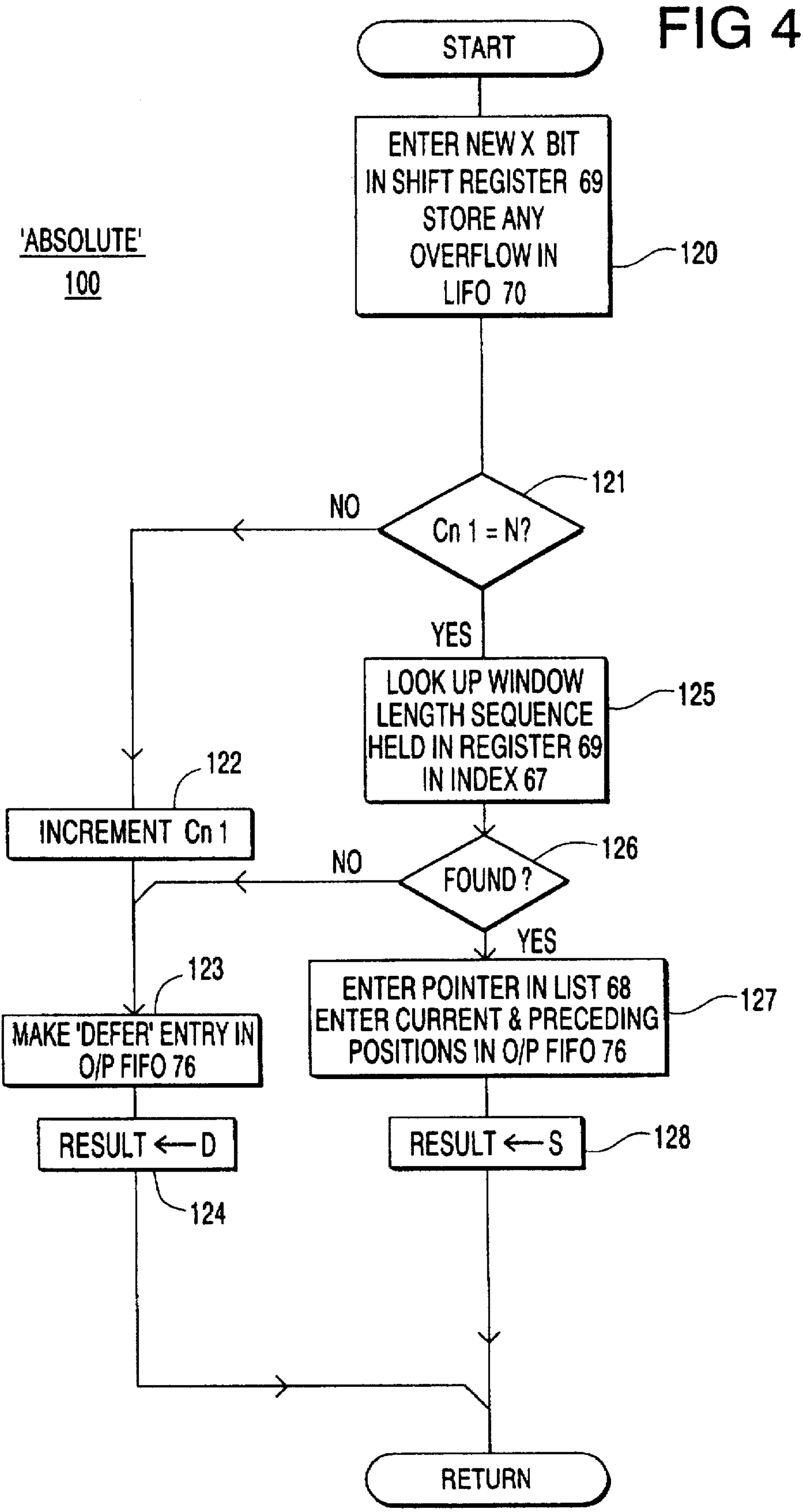
FIG. 4 is a flow chart of a tracking routine "ABSOLUTE" of the FIG. 3 process.

FIG. 4 is a flow chart of the absolute tracking routine 100. Upon entry into this routine, the new X bit value stored in NEW-X is entered into the initial X-position register 69 (step 120) to be accumulated with other X bit values to form a window length pattern for the X-sequence. The total number of XBIT values currently accumulated in the register 69 is held in count Cn1. Step 121 tests whether count Cn1 has yet reached the value N indicating that a window length sequence of X bits has been accumulated in the shift register 69. If count Cn1 is less than N, then the count is incremented (step 122) to take account of the newly added XBIT value, an X position entry is made in the output FIFO 76 with the associated Defer Flag set (step 123) for reasons which will become clear later, and the value "D" is assigned to RESULT (step 124) to indicate that a window length sequence is still being accumulated; thereafter the absolute tracking routine is exited.

If the test carried out in step 121 indicates from the value of count Cn1 that a window length sequence of N bits has been accumulated in the register 69, then the absolute tracking routine proceeds to step 125 where it looks up the value of the window length sequence stored in register 69 in the X-window index 67 with a view to ascertaining the current absolute X position. If the window length sequence is successfully found in the index 67, then a pointer to the corresponding position in the X-sequence is entered into the X-pointer list 68, together with a direction flag indicating the direction of reading of the X-sequence giving the window length sequence (step 127). An X position entry is also made in line output FIFO 76 with the associated Defer Flag not set, indicating that the entry is unconditional. Because the current position in the X-sequence is now known, it is possible to replace the last (N-1) X entries flagged as Defer entries in the output FIFO 76 with actual X-position values and this is also done in step 127. Any X entries flagged as Defer, that are positioned ahead of the replaced X entries in FIFO 76 may still be successively recovered through the back-tracking routine 113; consequently such entries are retained. In step 128, the value "S" is assigned to RESULT to indicate that the X-position has been successfully found and the incremental tracking mode may now be entered. In order to enable the back-tracking routine 113 to recover the sensed track occurring prior to initial position determination, any X bit values that are shifted out of shift register 69 when a new bit is entered in step 120, are stored in the overflow LIFO 70 (this is done as part of step 120).

If the window length sequence accumulated in register 69 is not found in index 67 (steps 125 and 126) then this indicates that one or more of the accumulated bits are in error or a track reversal has occurred; in either case the accumulation process must be continued. To this end, steps 123 and 124 are next executed before the absolute tracking routine 100 is exited. Note that it is not necessary to increment the count C1 because N bits have ready been accumulated and further processing takes place on the basis of losing the oldest bit accumulated in the register 69 as each new X bit is added to the register (the register 69 being of window length N). In due course the window length sequence remaining in the register will be successfully located in the index 67.

Figure 5:
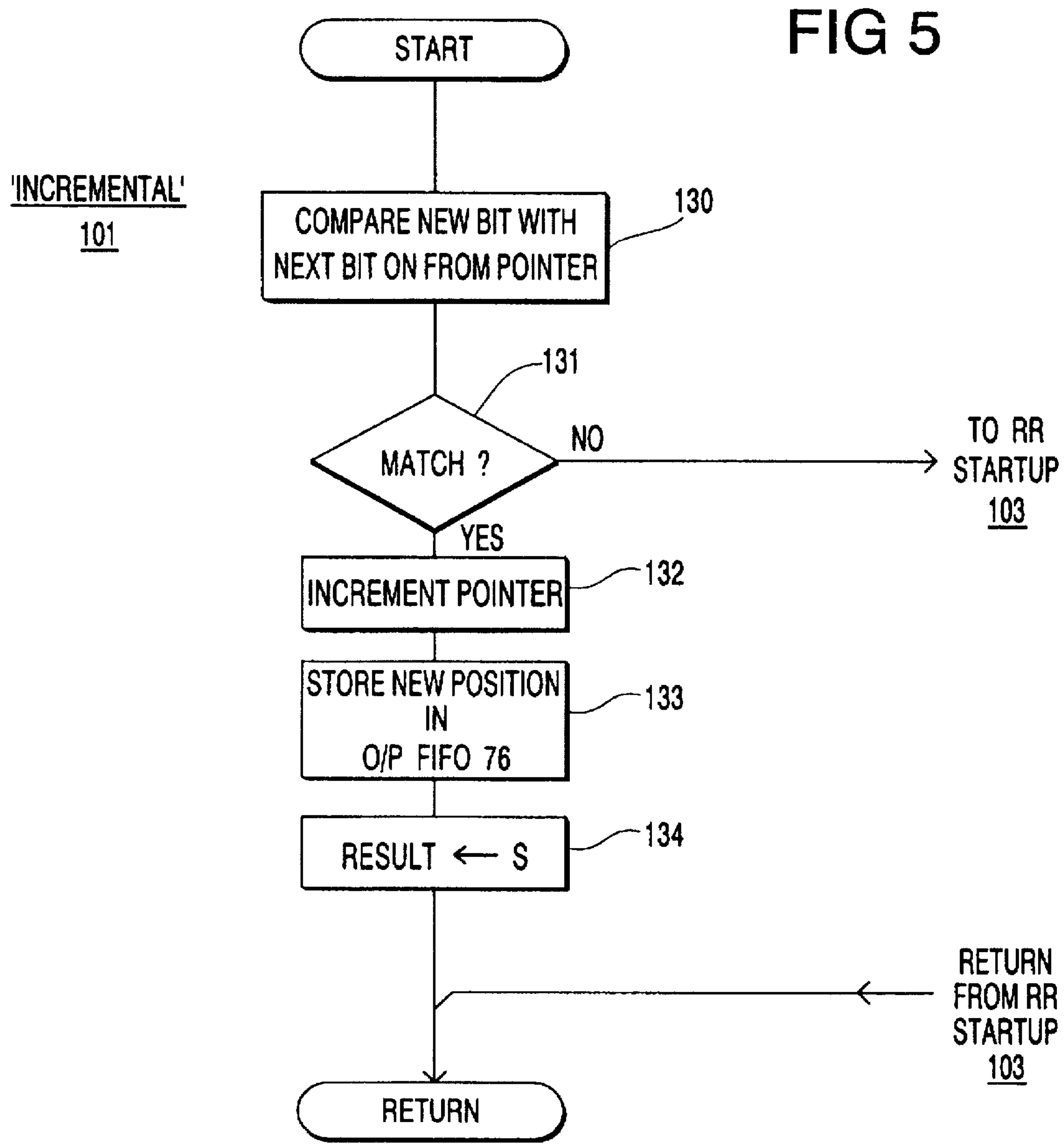
FIG. 5 is a flow chart of a tracking routine "INCREMENTAL" of the FIG. 3 process.

FIG. 5 is a flow chart of the incremental tracking routine 101. This tracking routine works on the basis that once the absolute X-position has been established, each new X bit can simply be used to increment the X-position by 1, the routine working on the assumption that the direction of X movement remains unaltered from that which was associated with the last position determination as represented by the pointer in the X position pointer list 68. However, in order to check the validity of this assumption, the value of each new bit as supplied from the low-level hardware 50 is compared with the value of the next X-sequence bit as predicted from the X-sequence stored in the register 66 given the current X-position and direction of movement (as indicated by the pointer in the pointer list 68). This check is carried out by step 130 in the FIG. 5 flow chart. If the actual and predicted values of the new X-sequence bit match (step 131) then the assumption about direction of movement is assumed valid and the X-position pointer held in the list 68 is incremented in the direction of movement indicated by the associated direction flag (step 132). Thereafter the new X-position is stored in the output FIFO 76 with the associated Defer Flag not set (step 133) and the value "S" is stored in RESULT (step 134). If, however, the value of the new X-position actually sensed differs from that predicted from the stored X-sequence, then a reversal of X-direction movement (movement along the X sequence) is assumed to have taken place and reversal recovery is initiated with the reversal recovery start-up routine (RR start-up 103) being called.

Figure 8:
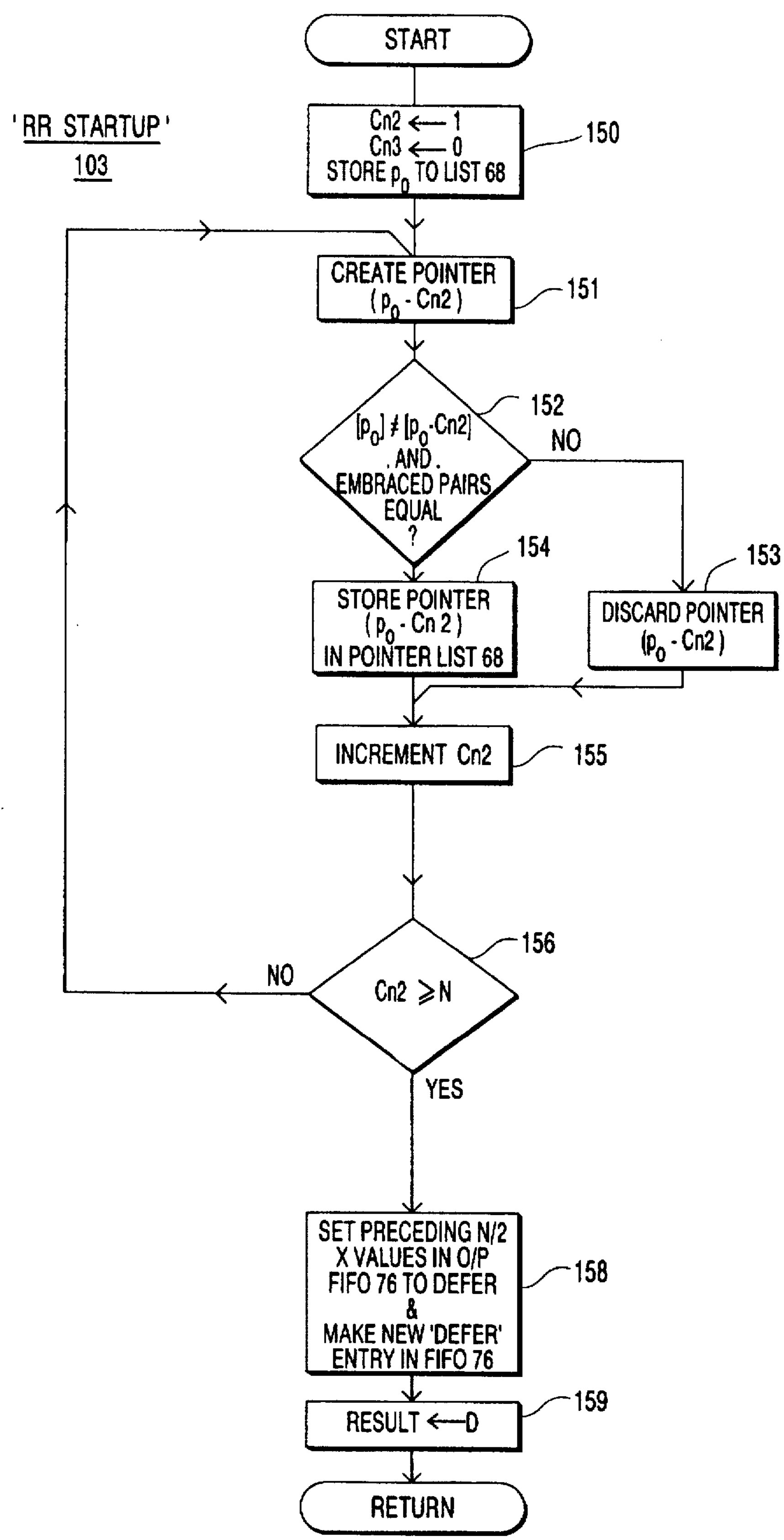
FIG. 8 is a flow chart of an initialisation routine "RR START-UP" for a reversal recovery routine of the FIG. 3 process.

Before describing the RR start-up routine 103 and the main reversal recovery routine 102, with reference to the flow charts of these routines shown in FIGS. 8 and 9 respectively, a general description will first be given of the reversal recovery process.

Figure 6A:
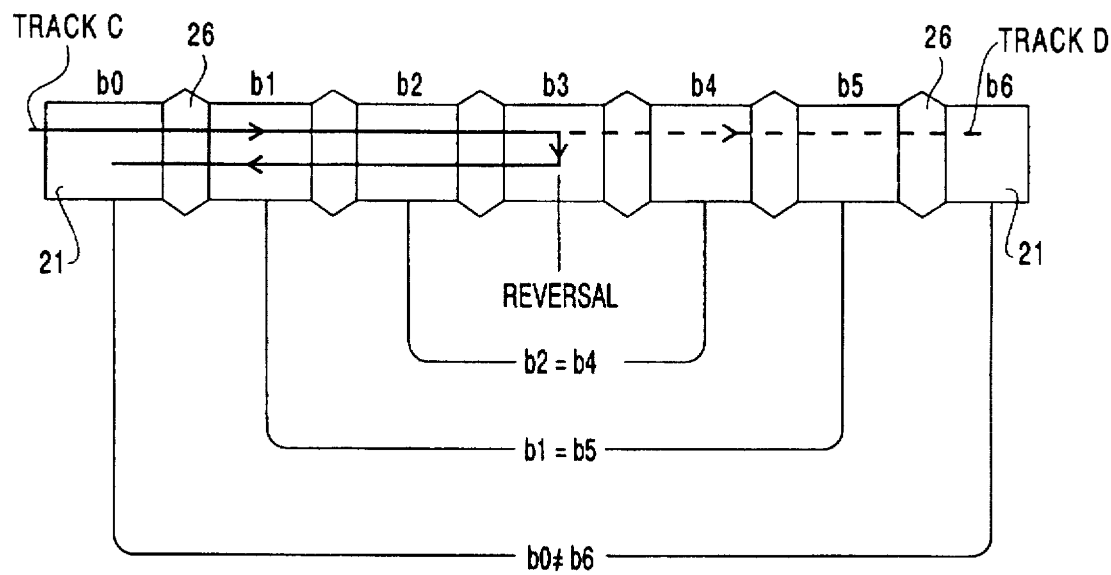
FIG. 6A is a diagram illustrating detection of a reversal of direction of movement of the sensor of the FIG. 1 apparatus, in the case where reversal occurs over a colour square of a pattern of the FIG. 2B form.

Considering first patterns of the FIG. 2B form (absolute value encoding, use of separators for cell delineation), FIG. 6A shows a series of seven colour squares (cells) 21 extending in the X-sequence direction, the squares representing X-sequence bits b0 to b7. The colour squares 21 are separated by separating zones (separators) 26. Track C shows the course of the sensing head 16 as it is moved over the squares representing bits b0, b1, b2 and b3 at which point the direction of movement of the sensing head is reversed and it returns over squares representing bits b2, b1 and b0. The dashed line marked track D is the track that the tracking process assumes the head 16 has followed from bit b3 until evidence is produced to the contrary.

With the tracking in its incremental mode, as the sensing head 16 moves along the initial portion of track C over the squares representing bits b0, b1, b2 and b3 each successive bit value sensed by the head 12 is matched with the corresponding bit predicted from the X-sequence held in register 66. When the direction of movement of the sensing head 16 is reversed over the square 21 representing bit b3, the next actual bit encountered is bit b2 whereas the next predicated bit is bit b4. In the current example, the X-sequence portion being traversed is such that the value of bit b2 equals that of bit b4. As a result, the bit value predicted by the incremental tracking routine matches that actually sensed so that the routine is not alerted to the fact that a reversal of direction took place over the square representing bit b3. The incremental tracking routine therefore assumes that the sensing head 16 is following track D. In due course the head 16 moves over the square representing bit b1 and the incremental tracking routine tests the value of the sensed bit with the value of the sequence bit b5 over which it believes the head 16 is now positioned. In the present example, the values of bits b1 and b5 are the same so that the incremental tracking routine again fails to detect the reversal of movement direction that occurred over the square representing bit b3. The sensing head 16 continues its movement along track C and reaches the square representing bit b0. In the present example the value of this bit b0 is different from that of b6 so that when the incremental tracking process tests the value of the next predicted bit along track D (this being bit b6), it discovers that the predicted bit value differs from the sensed bit value; at this time, therefore, the incremental tracking process detects that the sensing head 16 has reversed its direction of movement at some earlier stage. However, the tracking process has no means of directly ascertaining the point at which reversal took place.

Figure 6B:
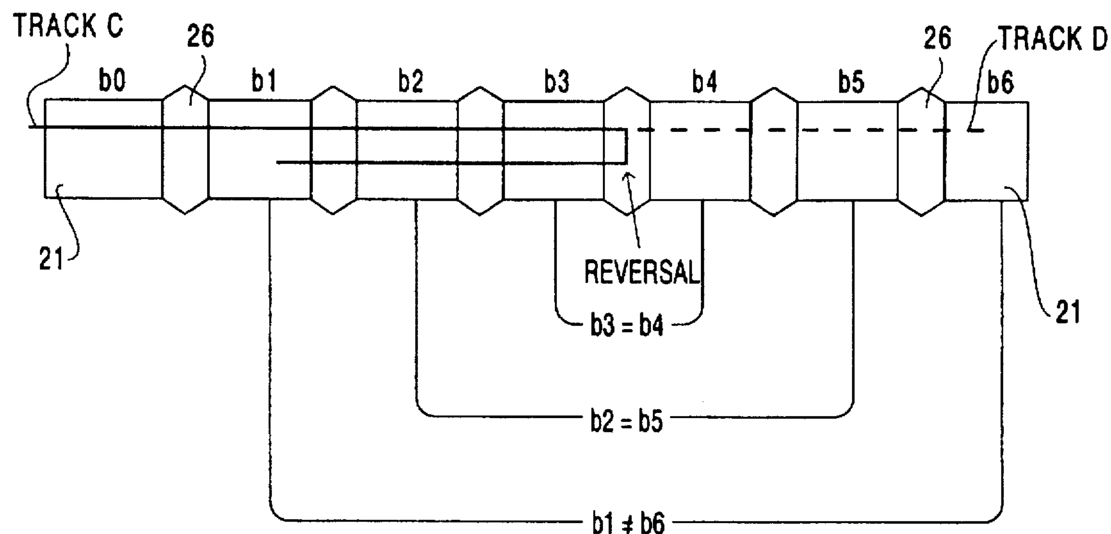
FIG. 6B is a diagram illustrating detection of a reversal of direction of movement of the sensor head of the FIG. 1 apparatus in the case where reversal occurs over a separating zone between two colour squares of a pattern of the FIG. 2B form.

FIG. 6B is similar to FIG. 6A in that it shows the seven colour squares that represent bits b0 to b7, but in this case track C has been drawn to show direction reversal occurring over a separating zone 26 rather than over a colour square 21. In the illustrated example, direction reversal occurs over the zone 26 separating the squares representing bits b3 and b4. The first square encountered by the sensing head 16 after this reversal is the square representing bit b3 whereas the incremental tracking process assumes that the encountered square is that representing bit b4. In the present example, the value of bit b3 equals that of b4 so that the incremental tracking process does not detect the reversal when it compares the actual value of bit b3 with the predicted value. Similarly, the next subsequent square encountered by the head 16 is that representing bit b2 and in the present example this has a value corresponding to the bit b5 so that again, the tracking process does not detect the direction reversal. However, in due course the head 16 moves over the square representing bit b1 which the tracking process tries to match with the predicted value of bit b6; in the present example the value of bits b1 and b6 differ so that at this point the tracking process detects that a direction reversal has occurred.

Figure 6C:
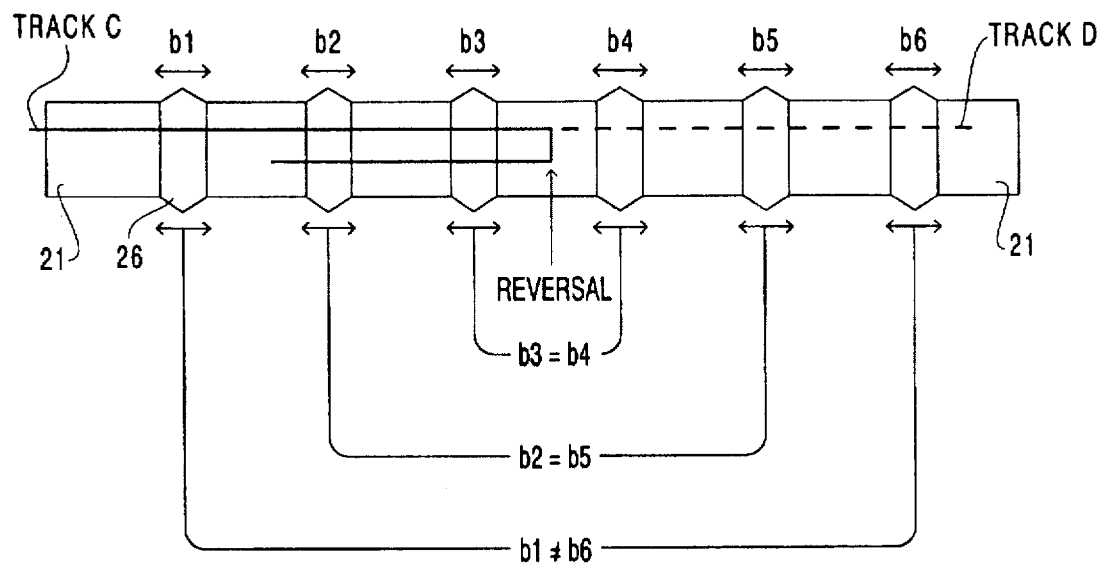
FIG. 6C is a diagram illustrating detection of a reversal of direction of movement of the sensor of the FIG. 1 apparatus, in the case where reversal occurs over a colour square of a pattern of the FIG. 2D form.

Considering next patterns of the FIG. 2D form (transitional encoding, use of separators for cell delineation), FIG. 6C is generally similar to FIGS. 6A and B in that it shows a series of seven colour squares 21 extending in the X-sequence direction and separated by zones 26; now, however, it is the transitions between the squares that represent the X-sequence bits (here, b1 to b6). Track C shows the course of the sensing head 16 as it effects transitions representing bits b1, b2 and b3 at which point the direction of movement of the sensing head is reversed over a colour square and the sensing head, now moving in the opposite direction, effects transitions representing bits b3, b2 and b1. The dashed line marked track D is the track that the tracking process assumes the head 16 has followed from bit b3 until evidence is produced to the contrary.

With the tracking in its incremental mode, as the sensing head 16 moves along the initial portion of track C sensing bits b1, b2 and b3, each successive bit value sensed by the head 12 is matched with the corresponding bit predicted from the X-sequence held in register 66. When the direction of movement of the sensing head 16 is reversed, the next actual bit sensed is bit b3 whereas the next predicted bit is bit b4. In the current example, the X-sequence portion being traversed is such that the value of bit b2 equals that of bit b4. As a result, the bit value predicted by the incremental tracking routine matches that actually sensed so that the routine is not alerted to the fact that a reversal of direction took place over the square common to the transitions representing bits b3 and b4. The incremental tracking routine therefore assumes that the sensing head 16 is following track D. In due course the head 16 effects the transition representing bit b2 and the incremental tracking routine tests the value of the sensed bit with the value of the sequence bit b5 which it believes the head 16 has just sensed. In the present example, the values of bits b2 and b5 are the same so that the incremental tracking routine again fails to detect the reversal of movement direction that occurred over the square common to the transitions representing bits b3 and b4. The sensing head 16 continues its movement along track C and in due course senses bit b1. In the present example the value of this bit b1 is different from that of b6 so that when the incremental tracking process tests the value of the next predicted bit along track D (this being bit b6), it discovers that the predicted bit value differs from the sensed bit value; at this time, therefore, the incremental tracking process detects that the sensing head 16 has reversed its direction of movement at some earlier stage. However, the tracking process has no means of directly ascertaining the point at which reversal took place.

Figure 6D:
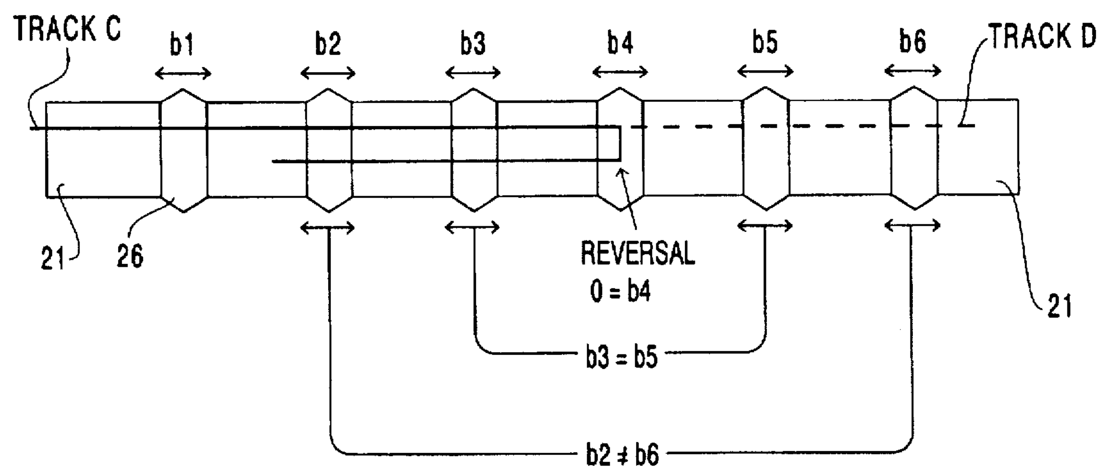
FIG. 6D is a diagram illustrating detection of a reversal of direction of movement of the sensor head of the FIG. 1 apparatus in the case where reversal occurs over a separating zone between two colour squares of a pattern of the FIG. 2D form.

FIG. 6D is similar to FIG. 6C but in this case track C has been drawn to show direction reversal occurring over a separating zone 26 rather than over a colour square 21. In the illustrated example, direction reversal occurs over the zone 26 in the transition representing bit b4. The first square encountered by the sensing head 16 after this reversal is the square last encountered by the head 16 with the result that a bit of value "0" is decoded (see Table 2), whereas the incremental tracking process assumes that the sensed bit is bit b4. In the present example, the value of bit b4 equals "0" so that the incremental tracking process does not detect the reversal when it compares the actual value of the sensed bit with the predicted value. Similarly, the next subsequent bit sensed by the head 16 is bit b3 and in the present example this has a value corresponding to the bit b5 so that again, the tracking process does not detect the direction reversal. However, in due course the head 16 senses bit b2 which the tracking process tries to match with the predicted value of bit b6; in the present example the value of bits b1 and b6 differ so that at this point the tracking process detects that a direction reversal has occurred.

For each of the examples of FIGS. 6A to D, all the tracking process is aware of is that at bit b6 a discrepancy has occurred between the sensed bit value and the predicted bit value. The tracking process does not know whether the assumed direction reversal has occurred over a colour square or a separating zone. The only limitation that can be assumed on where reversal occurred is that it must have taken place within N/2 bits of the bit b6 (where N is the window length of the X sequence) in a direction opposite to that previously assumed as the directional movement of the sensing head 16.

However, the actual sequence bit values over the preceding N bits, place certain constraints on where the reversal could have occurred because, of course, the succession of bit values that occur in the sequence from the reversal position but in the opposite direction to that assumed (i.e in the actual direction of movement) must be identical to the sequence of bits actually sensed. It is therefore possible to postulate a number of different reversal positions (with each of which there is an associated current actual position) and to carry out an initial elimination process by comparing the succession of bit values that would have been encountered from each reversal position (as predicted from the stored copy of the sequence) with the bit values actually sensed. In fact, in the present embodiment, rather than storing the values of the bits sensed for use in the aforesaid elimination process, use is made of the fact that, for each proposed reversal position, the relevant sensed bit values can be derived directly from the segment of the sequence extending from the proposed reversal position to the currently-predicted (but erroneous) position, the sensed bit values being:

(i) the same as the segment bit values from the proposed reversal position to the position immediately preceding the currently-predicted one (this is true since otherwise, a reversal would have been detected sooner);

(ii) for the current bit, the opposite value to that given by the sequence segment (this is so because at the current bit, a reversal was detected as a result of the predicted bit value differing from the sensed bit value).

Although the present embodiment carries out the elimination of proposed reversal positions by using the stored sequence as a means of deriving the bit values actually sensed, it will be appreciated that embodiments that directly store the last N bit values actually sensed are also possible.

Figure 7:
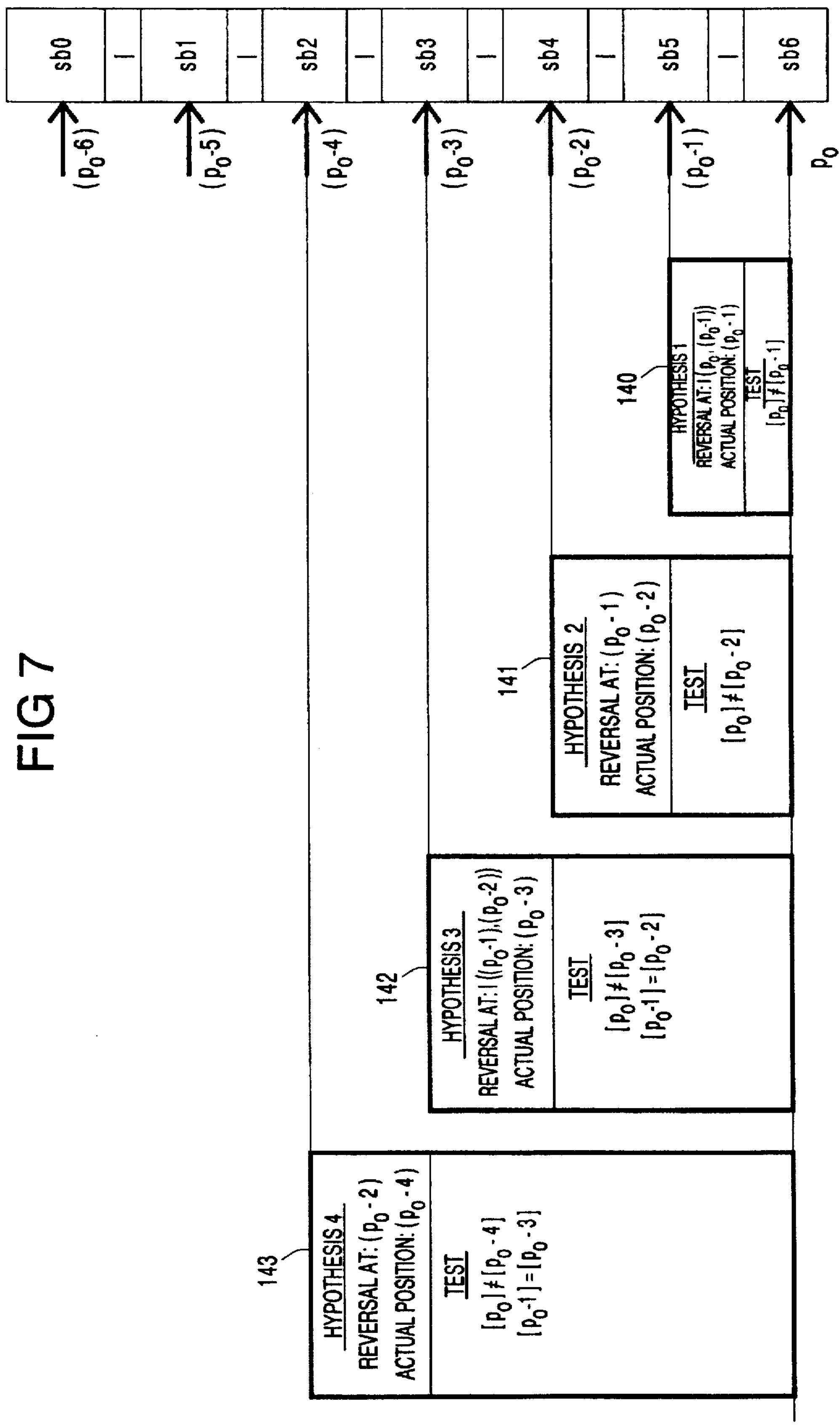
FIG. 7 is a diagram indicating how position recovery is achieved following a reversal of movement direction such as illustrated any one of FIGS. 6A to 6D.

The initial elimination process of potential reversal positions as carried out by the present embodiment, is illustrated in FIG. 7, the process itself being implemented by the RR Start-up routine 103.

In order to eliminate certain reversal positions, a number of hypotheses are constructed each postulating that direction reversal took place at a sequence bit or between two such bits; the possible reversal positions are represented in FIG. 7 by the sequence structure abstraction shown on the right-hand side of that Figure and composed of sequence bit squares sb0 to sb6 (corresponding to bits b0 to b6) and intermediate zones I between the sequence bit squares, direction reversal being possible at both sequence bit squares and intermediate zones I. In terms of the FIG. 2B pattern (absolute value encoding) direction reversal at a sequence bit square or at an intermediate zone respectively corresponds to a reversal at a colour square or at a separating zone, whilst in terms of the FIG. 2D pattern (transitional encoding), direction reversal at a sequence bit square or at an intermediate zone respectively corresponds to reversal at a separating zone (in as much as a bit is represented by a transition across such a zone) or at a colour square. The sequence structure abstraction of FIG. 7 is thus applicable to both absolute-value encoding and transition encoding and as the RR Start-up routine 103 and Reversal Recovery routine 102 both operate to this abstraction, these routines are also applicable to both absolute-value encoding and to transitional encoding.

To construct and test the reversal-position hypotheses, pointers are generated for each of the possible current actual X-sequence positions. For the purposes of the present explanation, if $p_O$ represents the pointer pointing to the sequence bit square (Sb6 in the example) at which a reversal is detected, then the pointer pointing to the preceding sequence bit square (sb5 in the example) is referenced ($p_O$-1), the pointer pointing to the sequence bit square before that (sb4 in the example) is referenced ($p_O$-2) and so on. In practice, each pointer points to the sequence bit represented by the corresponding sequence bit square of the sequence structure abstraction and in the following description the sequence bits themselves are generally referred to rather than the corresponding sequence bit square abstraction.

Of all the possible hypotheses regarding reversal position, there is one that has a special character in that it can be discounted for the FIG. 2B pattern and is initially untestable for the FIG. 2D pattern; this hypothesis (hypothesis 0) is that direction reversal has occurred at the current bit position. It will be appreciated that this hypothesis does not have significance for the FIG. 2B pattern; however, for the FIG. 2D pattern, it corresponds to reversal occurring over a separating zone (as in FIG. 6D). Hypothesis 0 is not initially testable for the FIG. 2D pattern because there is no information on which to carry out any test. Hypothesis 0 must therefore be retained as possibly true in the case of the FIG. 2D pattern (and, in fact, can also be retained for the FIG. 2B pattern as subsequent tests will generally eliminate it). As hypothesis 0 is not initially tested, it has not been shown in FIG. 7.

The first testable hypothesis (hypothesis 1 shown in block 140, FIG. 7) is that reversal occurred at the intermediate zone I intermediate the sequence bits pointed to by the pointers $p_O$, ($p_O$-1), this zone being indicated by the expression "I ($p_O$, ($p_O$-1))" shown in FIG. 7. Further according to hypothesis 1, the current actual position of the sensing head along the X-sequence is at the position pointed to by pointer ($p_O$-1), that is, bit b5 in the example. This hypothesis can be immediately rejected if the value of the bit pointed to by the pointer ($p_O$-1) is the same as the value of the bit pointed to by the pointer $p_O$ (in the example if b5=b6) since it is known that the value of the corresponding sensed bit differs from that of the bit pointed to by the pointer $p_O$. It should be noted that in FIG. 7 the convention is used that where a pointer is enclosed in square brackets it is the value of the bit pointed to by that pointer that is being referenced.

If the test for hypothesis 1 to be true is passed, then the pointer ($p_O$-1) is retained as possibly pointing to the current actual position of the sensing head 16. However, if the test for hypothesis 1 is failed, then the pointer ($p_O$-1) is discarded because it is known that the current actual position of the head 16 cannot be at the bit pointed to by that pointer.

Having tested hypothesis 1, hypothesis 2 (shown in block 141 in FIG. 7) is next considered. Hypothesis 2 is that reversal took place at the bit pointed to by pointer ($p_O$-1) and that the current actual position of the sensing head is at the bit pointed to by the pointer ($p_O$-2). Again, the hypothesis is tested by comparing the value of the bit pointed to by pointer $p_O$ with that at the hypothesized actual position, that is, the position indicated by pointer ($p_O$-2). If the tested bit values are equal then hypothesis 2 can be rejected since it is known that the value of the corresponding sensed bit differs from that of the bit pointed to by $p_O$. Pointer ($p_O$-2) is, in this case, discarded. On the other hand if the tested bit values are different, then hypothesis 2 is not rejected and pointer ($p_O$-2) is retained as a possible indicator of the current actual position.

After hypothesis 2 has been tested, hypothesis 3 (block 142) is next considered. This hypothesis postulates that reversal occurred over the zone I separating the bits pointed to by pointer ($p_O$-1) and ($p_O$-2), the current actual position of the sensing head being at the bit pointed to by pointer ($p_O$-3). This time, the hypothesis can be subjected to two tests, the first test being one corresponding to the tests carried out for hypothesis 2 and I by which the value of the bit pointed to by pointer $p_O$ is compared with the value of the bit pointed to by the pointer that according to the hypothesis, indicates the current actual position; the hypothesis is discarded if these bit values are equal. The second test for hypothesis 3 is whether the values of the bits enclosed between the incorrectly assumed position and the hypothesised actual position are equal (the bit value on the side of the postulated reversal position nearest position $p_O$ being a true s indicator of the value of the corresponding sensed bit). In other words, the value of the bit pointed to by pointer ($p_O$-1) is compared with the value of the bit pointed to by pointer ($p_O$-2) and the hypothesis 3 is rejected and pointer ($p_O$-3) is discarded as a potential actual position indicator if the compared bit values differ.

Next, hypothesis 4 (block 143 in FIG. 7) is constructed and tested, this hypothesis being that reversal occurred at the bit pointed to by pointer ($p_O$-2) and that the actual current position is indicated by the pointer ($p_O$-4). The testing of this hypothesis proceeds in essentially the same manner as for hypothesis 3 and will therefore not be described in detail. Similarly, further hypotheses are constructed and tested for reversal positions and actual current positions successively further away from the position pointed to by pointer $p_O$. It will be appreciated that for each hypothesised reversal position and corresponding hypothesised actual current position, there will be:

(i) in every case (except in respect of hypothesis 0), a first test involving the comparison of the bit values, at the hypothesised actual current position ($p_O$-Cn2) and at the position pointed to by $p_O$ (the hypothesis being rejected if those values are the same as the corresponding sensed bit must have a value different to that of the bit pointed to by $p_O$);

(ii) for cases where the hypothesised reversal position is spaced by at least one bit from the hypothesised current position, one or more second tests in which the bit values of the bits of the or each pair of bits symmetrically disposed about the hypothesised reversal position are compared (the hypothesis being rejected if these values differ as the bit of each pair which lies nearer $p_O$ has a value equal to the corresponding sensed bit).

Clearly the further away that the hypothesized actual position is from position $p_O$, the more opportunities there are to test the hypothesis concerned since the number of enclosed bit pairs which are subject to the second test, increases the greater the separation of the hypothesized actual position is from $p_O$.

In due course all relevant hypotheses will have been constructed and tested (a relevant hypothesis being one for which the hypothesized actual position lies within the window length range of position $p_O$). At the end of this process there will only be a few remaining valid hypotheses, these hypotheses being represented by the pointers to their hypothesized current actual position.

As already indicated the process generally described above with reference to FIG. 7 is implemented by the RR start-up routine 103 that is initiated by the incremental tracking routine 101 upon discovery of a mismatch between a sensed bit value and the predicted bit value. FIG. 8 shows a flow chart of the RR start-up routine 103. Upon entering into the routine, the value "1" is assigned to count Cn2, the value "0" is assigned to count Cn3, and the pointer $p_0$ is placed in the pointer list 68 (step 150). Next, a pointer ($p_0$-Cn2) is created, this being a pointer to a hypothesized current actual position (step 151). Thereafter, the tests possible for checking validity of the hypothesized current actual position are carried out (step 152), these being the first and second tests described above.

If one or more of the test or tests available for testing the currently hypothesized actual position is failed, then the corresponding pointer ($p_0$-Cn2) is discarded (step 153). On the other hand if all tests for the hypothesized current actual position are passed, then the hypothesized current actual position pointer is stored in the pointer list 68 (step 154) with its associated direction flag indicating a direction opposite to that associated with pointer $p_0$.

After storage or discardal of the pointer ($p_0$-Cn2), count Cn2 is incremented to keep track of however many pointers to hypothesized current actual positions have been created and tested (step 155). If the incremented value of count Cn2 exceeds the window length N of the X-sequence, then no further pointers to hypothesized current actual position are created (see step 156). At this stage, the pointer $p_0$ may be discarded from the pointer list 68 if the pattern 20 is of the FIG. 2B form. If the value of count Cn2 is less than N when tested in step 156, then the routine loops back to step 151 to create another pointer to a new hypothesized current actual position, the process of steps 151 to 155 being repeated until pointers to all possible current actual positions have been created and tested.

Next, the Defer Flags of the preceding N/2 X position entries in the output FIFO 76 are set to indicate that one or more of these position values is incorrect and that updated values will be provided as soon as they are available (step 158). A new X-position entry with its Defer Flag set is also made in FIFO 76 in respect of the currently sensed bit on the basis of which reversal was detected. Thereafter, the value of "D" is assigned to RESULT (step 159) and the RR startup routine 103 is exited.

Upon the RR start-up routine 103 being exited, the pointer list 68 contains a set of pointers to a number of hypothesized actual positions which have passed the initial validity tests.

As a consequence of the value "D" being assigned to RESULT on exiting of the RR start-up routine 103, the tracking mode is changed to reversal recovery so that upon the sensing head 16 sensing a new X-sequence bit, the reversal recovery routine 102 will be entered. The newly provided X-sequence bit enables further testing of the hypothesized actual current positions represented by the pointers stored in the pointer list 68 because the sensed bit value can be compared with the value predicted by taking each hypothesized current actual position in turn. Thus, referring to the flow chart of the reversal recovery routine shown in FIG. 9, in step 161 the first/next pointer in the pointer list 68 is taken and the value of the next bit predicted from this point is compared with the actual sensed bit value (step 162). If there is a mismatch between the predicted and sensed bit values, then the corresponding pointer is discarded from the pointer list 68 (step 163). On the other hand, if the predicted and sensed bit values correspond, then the relevant pointer is incremented and restored to the pointer list 68 (step 164). Thereafter a check is made to see if there are any further pointers to be processed in the pointer list 68 (step 165) and, if so, the routine loops back to the step 161.

Once all the pointers in the list 68 have been processed, the total number of pointers remaining in the list is examined (step 166). If no pointers remain in the list, then an irrecoverable situation has been encountered; this may have arisen either due to sensing errors or because the direction of movement has been reversed again during the reversal recovery process. In any case, the value "L" is assigned to RESULT (step 167) and the reversal recovery routine is exited.

However, if the number of pointers remaining in the pointer list 68 is only 1, then it is assumed that this pointer correctly points to the current actual position of the sensing head. Accordingly, the routine 102 proceeds to derive actual X-position values for all the X-entries that have had their Defer Flags set in the output FIFO 76, these new position values being entered into the FIFO 76 together with the current actual position (step 168). Thereafter the value "S" is assigned to RESULT and the reversal recovery routine is exited.

If there are still multiple entries in the pointer list 68 so that it is not yet possible to decide what the actual current X-position really is, then subject to certain criteria to be explained below, the reversal recovery routine makes a deferred entry into the output FIFO 76 by setting the defer flag of a new X entry (step 172) and assigns the value "D" to RESULT before exiting the reversal routine.

Thereafter, the reversal recovery routine is executed as each new X bit value is read in until all pointers other than the correct one have been eliminated from the pointer list.

If only one reversal has occurred and there are no reading errors, then the elimination process should be successful within (N-2) iterations of the reversal recovery routine. Failure to isolate the correct pointer within (N-2) iterations indicates that the X-position has been irrecoverably lost. In order to detect this situation the count Cn3 is incremented each time the test (step 166) is exited on the branch corresponding to multiple pointer entries in the list 68, this incrementing being effected in step 170. Thereafter, the value of count Cn3 is compared to the value (N-2) (step 171) and only if Cn3 is less than or equal to (N-2) are steps 172 and 173 executed. If the value of count Cn3 is greater than (N-2) then the value "L" is assigned to RESULT (step 174) and the reversal recovery routine 180 is exited.

In summary, it can be seen that the incremental tracking routine 101, RR start up routine 103, and reversal recovery routine 102, work together to provide a tracking process that given an initial position fix, is capable of dealing with subsequent incremental movements and reversals. More particularly, this tracking process involves keeping track of the current X-position by the incremental process implemented by incremental tracking routine 101. If the incremental tracking routine detects a discrepancy between the actual sensed bit value and the value of the next predicted bit of the X-sequence, then a reversal is assumed to have occurred and the reversal recovery process is initiated by execution of the RR start-up routine 103 to establish a set of pointers to possible current actual X-positions and to carry out initial validity tests on these pointers. Thereafter, the reversal recovery 102 is executed as each new X bit value is read in and used to carry out further validity tests on the sets of possible pointers to the current actual X-position. In due course the current X-position will either be established by routine 102 or a decision is made that the X-position has been irrecoverably lost.

The tracking process implemented by routines 101, 102 and 103 working together can be used for both 'forward' tracking and 'back' tracking. FIG. 3 explicitly shows the inter-association of the routines 101, 102 and 103 for forward tracking whilst their association for back-tracking is illustrated in FIG. 10 which is a flow chart of the back tracking routine 113 of FIG. 3. The back-tracking routine will now be described with reference to FIG. 10.

The determination of an initial absolute position for the sensing head 16 requires that this head be moved along the pattern 20 over a distance corresponding to an X sequence window-length sub sequence, without any direction reversals; it is only in this manner that the absolute tracking routine 100 will be able to build up a window-length sub sequence for the purposes of absolute position determination. The opening part of the track of the sensing head may or may not constitute such a window-length reversal-free track—if it does, then the absolute tracking mode routine 100 is effective to determine head position not only at the end of this reversal-free track length, but also back to the beginning of that track according to the process of step 127 in FIG. 4. However, if the opening path of the sensing head includes reversals occurring before a windowing-length sub sequence has been built up, then when eventually a sufficiently long reversal-free track portion does occur enabling the absolute tracking routine 100 to obtain a position fix, there will be an initial track portion that is not recovered by step 127 of the absolute tracking routine. The XBIT values applicable to this unrecovered initial track portion are, however, stored in LIFO 70 (this being effected by step 120 of the routine 100) and are usable by the back-tracking routine 113 for attempting recovery of the initial track.

The back tracking routine 113 is called following a successful absolute position determination by routine 100 but only in the case that LIFO 70 is not empty (that is, in cases where there is an initial unrecovered track portion).

The first operation of the back-tracking routine 113 is to set the tracking mode to incremental (step 179). Next, the pointer held in list 68 that indicates the absolute position just determined by the routine 100, is saved together with its associated directions flag. The saved position pointer points to the position in the X sequence of the last bit taken off the buffer 64 for processing. As already indicated, the absolute tracking 100 has also calculated the preceding N-1 positions (that is, back to the beginning of the window-length sub sequence held in the register 69). Accordingly the back-tracking routine 113 does not need to concern itself with these latter positions and can start its tracking operation from the position of the oldest bit held in the register 69. To this end, step 180 of the back tracking routine 113 after saving the pointer and direction flag from the top of list 68, places a new pointer in list 68 indicating the X sequence position of the oldest bit held in register 69; in addition, the direction flag associated with this pointer is set to a direction of movement along the X sequence opposite to that of the pointer that has just been saved.

Next the tracking process formed by the working together of the incremental tracking routine 101, are RR start-up routing 103, and the reversal recovery routine 102 is run with new XBIT values being taken from the top of LIFO 70 rather than from the buffer 64 (as would be the case if forward tracking was being carried out). More particularly, in step 181 of the back-tracking routine 113, a check is made to see whether LIFO 70 is empty and if there are XBIT values still in LIFO 70 the next value is stored in variable NEW-X (step 182). Incremental tracking or reversal recovery is then carried out as determined by the value of the variable TMODE by steps 107, 101, 103, and 102 in the same manner as previously described with reference to FIG. 3.

One significant difference does exist in execution of the routines 101, 102 and 103 during the back-tracking process as opposed to when they are used during forward tracking, this difference relating to how the routines use the output buffer 63. More particularly, it should be noted that the buffer 63 already contains entries relevant to the initial track positions, these entries having been made by the absolute tracking routine 100 at which time they were set to Defer. Furthermore, as the back tracking process advances towards the beginning of the initial track being recovered, it will be appreciated that its interface with the output buffer 63 also advances to the head of that buffer. In practical terms this difference between the forward tracking and back tracking processes means that in the incremental routing 101 the step 133 of storing a new position in the output FIFO 76 is modified during back-tracking to storing a position value in the corresponding existing entry in that FIFO. As will be appreciated by persons skilled in the art, it is a relatively simple matter to keep track of which entry needs to be modified by the use of an appropriately updated pointer into the FIFO 76. With reference to the RR start-up routine 103 shown in FIG. 8, step 158 is modified during back-tracking to set the appropriate existing entries in the FIFO 76 to Defer, it being appreciated that in the context of back-tracking the reference to "preceding" in step 158 means entries further away from the head of FIFO 76. Similar modifications are also required to steps 168 and 173 of the reversal recovery routine 102 during back-tracking as will be apparent to persons skilled in the art.

After the incremental or reversal recovery tracking routine has been implemented for the most recently fetched XBIT from LIFO 70, step 183 of the back-tracking routine 113 tests the result of the tracking operation. If the value of the variable RESULT is "S" then the tracking mode is set to incremental (step 184) whereas if the variable RESULT is set to "D" the tracking mode is set to reversal recovery (step 185); in either of these latter cases the back-tracking routine 113 then loops back to step 181 to see if further bits need processing from LIFO 70. If the test carried out in step 181 now shows that LIFO 70 is empty, then the back-tracking process is terminated after first carrying out steps 186 and 187 to be described below. However, if the LIFO 70 still contains XBITS, then further iterations of the tracking process are carried out. Returning now to consideration of step 183, if the value of the variable RESULT is "L", then the back-tracking routine has reached a stage where it can no longer sensibly ..recover any position information; the back-tracking routine 113 is then exited after first carrying out steps 186 and 187.

In step 186 all entries marked as Defer in the output FIFO 76 are discarded as there is no possibility of these entries being recovered. In addition LIFO 70 is emptied if this has not already been done. In step 187 the initial position pointer and direction flag saved in step 180 are now restored to list 68 in order to permit forward tracking to resume from the position previously established by the absolute tracking routine 100. Conditions have now been set up for a return to the main XBIT process 60 to continue forward tracking in the manner already described.

Having described the operation of the XBIT process 60, it simply remains to explain the function of the output process 62 of FIG. 1. This output process is straightforward in that it monitors the head of the FIFO 76 and if the head entry is not set to Defer, the process 62 outputs the position information contained in that entry.

It will be appreciated that although in the foregoing description of the FIG. 1 apparatus the tracking processes have been described with reference to the FIG. 2B and FIG. 2D patterns that include separators 26, the principles of the tracking process and, in particular, of the reversal recovery processes can also be applied to patterns of the FIG. 2A and FIG. 2C form that do not include separators. Indeed, reversal recovery in the case of patterns that do not include separators is more simply implemented since these cases correspond to the situation shown in FIG. 6A or FIG. 6C but cannot give rise to the situation shown in FIG. 6B or FIG. 6D with the result that the number of hypotheses that need to be tested is substantially less.

Although the forward and back-tracking processes described essentially operate on linear sequences, it is to be understood that they need not only be employed in apparatus for sensing position along a linear pattern 20 and can also be used in apparatus for sensing position over a two-dimensional pattern where the latter is based on two windowing sequences extending parallel to respective nonparallel axes. The construction of suitable two-dimensional patterns from such windowing sequences, the separation of the sequences by the sensing hardware, and the combination of derived X and Y coordinate positions to provide a combined output position, are all described in the aforesaid International Patent Application No. PCT/GB92/00594 to which reference is directed.

It will, of course, be appreciated that the above described back-tracking process can be implemented independently of any forward tracking process and simply requires for its operation the determination of an initial position in some manner.

We claim:

1. A method of determining the track of an element in terms of the components of its displacement parallel to a predetermined axis, said element being movable relative to a pattern having pattern features which considered in directions parallel to said predetermined axis form a series exhibiting a windowing property, said method involving:

sensing a succession of pattern features of said series traversed by the element in moving relative to said pattern, and storing a representation of said succession of features, determining an initial location for said element along said predetermined axis by comparing window-length portions of the stored representation of said succession of features with a stored representation of said series, the detection of a match at any particular position along the stored representation of said series serving to determine the location of said element along said series, and following the determination of said initial location, carrying out a backtracking process to seek to recover an initial track of the element over at least the pattern features of said succession that precede those of the window-length portion used in determining the initial location of the element.

2. A method according to claim 1, wherein said series of pattern features is an encoding of a binary windowing sequence, the said representations of said series and of said succession of pattern features being in terms of the unencoded binary windowing sequence.

3. A method according to claim 1, wherein said back-tracking process involves working backwards through the stored representation of said succession of features, starting from a position corresponding to a current known location of said element along said series to determine earlier locations of the element by:

for each new portion of the stored representation of said succession of pattern features that is encountered in working backwards therethrough, comparing that portion with that predicted from the stored representation of said series on the basis of an incremental change having occurred in said current location in an assumed direction of movement, and acting on the result of said comparison as follows:

(i) where said comparison produces a match, updating the current location of the element by an incremental change in said assumed direction of movement, (ii) where said comparison produces a mismatch, carrying out a recovery process to recover the location of the element along said series, said recovery process involving deriving at least one candidate location for the element on the basis that the direction of movement of the element has been reversed, and comparing a representation of the succession of pattern features sensed along the track of the element with a representation of the pattern features predicted to lie along the element's track in reaching each said candidate location whereby to test the validity of each such location.

4. A method according to claim 3, wherein the validity of the or each said candidate location is tested during the recovery process by predicting, on the basis that a reversal of movement occurred at a location midway between the candidate location and the currently-determined one, the representation of said succession of pattern features that would be stored during movement between said midway and candidate locations, comparing this prediction with the corresponding part of the actual stored representation of said succession of features, and rejecting the candidate location if this comparison results in a mismatch.

5. A method according to claim 3, wherein said recovery process involves testing the validity of the candidate location by:

(i) predicting a pattern portion sensible at the candidate location, comparing it with that predicted on the basis of an incremental change in said current location in said assumed direction of movement, and rejecting the candidate location if this comparison results in a match, and/or (ii) on the assumption that a reversal of movement occurred at a location midway between said candidate location and the currently-determined location, predicting the representation of said succession of pattern features that would be stored during movement between said midway and candidate locations, but not including the latter location; comparing this prediction with the part of said representation of said series that leads up to said current location, and rejecting the candidate location if this comparison results in a mismatch.

6. A method according to claim 3, wherein a plurality of candidate locations are derived and remain unrejected following the testing of their validity, said recovery process further involving comparing each said new portion encountered in working backwards through the stored representation of said succession of pattern features, with predictions based on each remaining candidate location, a said remaining candidate location being rejected where this comparison results in a mismatch.

7. A method of determining the track of an element in terms of the respective components of its displacement parallel to first and second axes that together form a two-dimensional coordinate system, said element being movable relative to a two dimensional pattern having pattern features which considered in directions parallel to said first and to said second axis form respective series each exhibiting a windowing property, said method employing the method of claim 1 for determining initial components of the element's displacement both parallel to said first axis and parallel to said second axis.

8. Apparatus for determining the track of an element in terms of the components of its displacement parallel to a predetermined axis, said element being movable relative to a pattern having pattern features which considered in directions parallel to said predetermined axis form a series exhibiting a windowing property, said apparatus comprising:

means for sensing a succession of pattern features of said series traversed by the element in moving relative to said pattern, and for storing a representation of said succession of features, means for determining an initial location for said element along said predetermined axis by comparing window length portions of the stored representation of said succession of features with a stored representation of said series, the detection of a match at any particular position along the stored representation of said series serving to determine the location of said element along said series, and means operative following the determination of said initial location, to carry out a backtracking process to seek to recovery an initial track of the element over at least the pattern features of said succession that precede those of the windowing-length portion used in determining the initial location of the element.

9. A method according to claim 2, wherein said backtracking process involves working backwards through the stored representation of said succession of features, starting from a position corresponding to a current known location of said element along said series to determine earlier locations of the element by:

for each new portion of the stored representation of said succession of pattern features that is encountered in working backwards therethrough, comparing that portion with that predicted from the stored representation of said series on the basis of an incremental change having occurred in said current location in an assumed direction of movement, and acting on the result of said comparison as follows:

(i) where said comparison produces a match, updating the current location of the element by an incremental change in said assumed direction of movement, (ii) where said comparison produces a mismatch, carrying out a recovery process to recover the location of the element along said series, said recovery process involving deriving at least one candidate location for the element on the basis that the direction of movement of the element has been reversed, and comparing a representation of the succession of pattern features sensed along the track of the element with a representation of the pattern features predicted to lie along the element's track in reaching each said candidate location whereby to test the validity of each such location.

10. A method of determining the track of an element in terms of the respective components of its displacement parallel to first and second axes that together form a two-dimensional coordinate system, said element being movable relative to a two-dimensional pattern having pattern features which considered in directions parallel to said first and to said second axis form respective series each exhibiting a windowing property, said method employing the method of claim 2 for determining initial components of the element's displacement both parallel to said first axis and parallel to said second axis.

11. A method of determining the track of an element in terms of the respective components of its displacement parallel to first and second axes that together form a two-dimensional coordinate system, said element being movable relative to a two-dimensional pattern having pattern features which considered in directions parallel to said first and to said second axis form respective series each exhibiting a windowing property, said method employing the method of claim 3 for determining initial components of the element's displacement both parallel to said first axis and parallel to said second axis.

12. A method of determining the track of an element in terms of the respective components of its displacement parallel to first and second axes that together form a two-dimensional coordinate system, said element being movable relative to a two-dimensional pattern having pattern features which considered in directions parallel to said first and to said second axis form respective series each exhibiting a windowing property, said method employing the method of claim 4 for determining initial components of the element's displacement both parallel to said first axis and parallel to said second axis.

13. A method of determining the track of an element in terms of the respective components of its displacement parallel to first and second axes that together form a two-dimensional coordinate system, said element being movable relative to a two-dimensional pattern having pattern features which considered in directions parallel to said first and to said second axis form respective series each exhibiting a windowing property, said method employing the method of claim 5 for determining initial components of the element's displacement both parallel to said first axis and parallel to said second axis.

14. A method of determining the track of an element in terms of the respective components of its displacement parallel to first and second axes that together form a two-dimensional coordinate system, said element being movable relative to a two-dimensional pattern having pattern features which considered in directions parallel to said first and to said second axis form respective series each exhibiting a windowing property, said method employing the method of claim 6 for determining initial components of the element's displacement both parallel to said first axis and parallel to said second axis.

* * * * *